US012794918B2

(12) United States Patent
Urmanov et al.

(10) Patent No.: US 12,794,918 B2
(45) Date of Patent: Nov. 10, 2026

(54) CHARACTERIZATION OF ACTIVITY OF USERS IN CLOUD APPLICATIONS AND SERVICES

(71) Applicant: ORACLE INTERNATIONAL CORPORATION, Redwood Shores, CA (US)

(72) Inventors: Aleksey Urmanov, San Diego, CA (US); Felix Schmidt, Niederweningen (CH); Daniel P. Kleber, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 66 days.

(21) Appl. No.: 18/748,843

(22) Filed: Jun. 20, 2024

(65) Prior Publication Data

US 2025/0392607 A1 Dec. 25, 2025

(51) Int. Cl.
*H04L 9/40* (2022.01)

(52) U.S. Cl.
CPC ................................ *H04L 63/1425* (2013.01)

(58) Field of Classification Search
CPC ................................................... H04L 63/1425
See application file for complete search history.

(56) References Cited

U.S. PATENT DOCUMENTS

| | | | | |
|---|---|---|---|---|
| 8,583,649 | B2 * | 11/2013 | Ailon | G06F 16/906 707/738 |
| 9,147,167 | B2 | 9/2015 | Urmanov et al. | |
| 9,514,213 | B2 | 12/2016 | Wood et al. | |
| 10,163,034 | B2 | 12/2018 | Urmanov et al. | |
| 10,956,779 | B2 | 3/2021 | Urmanov et al. | |
| 10,992,675 | B2 | 4/2021 | Urmanov et al. | |
| 11,169,506 | B2 * | 11/2021 | Arashanipalai | G06N 5/02 |
| 12,072,956 | B2 * | 8/2024 | Nussbaum | G06F 16/285 |
| 2017/0316079 | A1 * | 11/2017 | Lu | G06F 16/285 |
| 2018/0322363 | A1 * | 11/2018 | Urmanov | G06F 18/23213 |
| 2018/0359270 | A1 * | 12/2018 | Chari | H04L 63/102 |

(Continued)

OTHER PUBLICATIONS

David M. Blei et al.: "Latent Dirichlet Allocation", Journal of Machine Learning Research 3 (2003) pp. 993-1022.

(Continued)

*Primary Examiner* — Joe Chacko
(74) *Attorney, Agent, or Firm* — Kraguljac Law Group, LLC

(57) ABSTRACT

Systems, methods, and other embodiments associated with self-reliant characterization of activities of users are described. In one embodiment, a method includes generating a dataset of data points from a batch of electronic log messages that describe electronic actions taken by various accounts. A data point collectively describes actions of a single account. The method includes modeling distinct activities based on clustering of the data points into M behavioral groups and inferring M or more distinct activities from the dataset by probabilistic activity modeling of the actions. The value of M is derived automatically during the clustering. The method includes predicting activity of a user account to be non-conformant based on other accounts in a behavioral group satisfying a threshold for similarity. And, the method includes generating an electronic alert that indicates the user account to have non-conformant activity.

20 Claims, 10 Drawing Sheets

(56) References Cited

U.S. PATENT DOCUMENTS

| | | | | |
|---|---|---|---|---|
| 2022/0382736 A1* | 12/2022 | Beilis | G06N 3/045 |
| 2023/0252055 A1* | 8/2023 | Allen | G06F 16/24568 707/740 |
| 2024/0370465 A1* | 11/2024 | Nussbaum | G06F 18/231 |

OTHER PUBLICATIONS

Salton et al.: "Term Weighting Approaches in Automatic Text Retrieval", Technical Report, Cornell University, Ithaca, NY, USA, Information Processing & Management vol. 24, No. 5, pp. 513-523, 1988.
Webb et al.: "Machine Learning for User Modeling", User Modeling and User-Adapted Interaction, 11: 19-29, 2001, (c) Kluwer Academic Publishers. Printed in The Netherlands (11 pgs).
Ball et al.: "Efficient-Driven Validation of Rule-Based User Models in Personalization Applications", Data Mining and Knowledge Discovery 5 (2001) pp. 33-58.
Barla, et al.: "Rule-Based User Characteristics Acquisition from Logs with Semantics for Personalized Web-Based Systems", Computing and Informatics vol. 28, 2009 1001-1028, V May 13, 2009 (28 pgs.).
Denning, Dorothy E.: "An Intrusion-Detection Model," IEEE Transactions on Software Engineering, vol. SE-13, No. 2, Feb. 1987 (17 pgs).
Yang et al.: "Graph Attention Topic Modeling Network", WWW '20, Apr. 20-24, 2020, Taipei, Taiwan (c) 2020 Association for Computing Machinery, ACM ISBN 978-1-4503-7023-3/20/04, retrieved https://doi.org.10.1145.3366423.2280102) (11 pgs).
Srivastava et al.: "Autoencoding Variational Interference for Topic Models", Published as a Conference Paper ICLR 2017 retrieved arXiv:1703.01488v1 [stat.ML] Mar. 4, 2017 (12 pgs).
Hu et al.: "A Latent Concept Topic Model for Robust Topic Inference Using Word Embeddings," Department of Computer Science, The University of Tokyo, Japan, Artificial Intelligence Research Center AIST, Japan, and School of Computer Science, The University of Manchester, UK (7 pgs).
Nguyen et al.: "Improving Topic Models for Robust Topic Inference Using Word Embeddings", retrieved arXiv.1810.06306v1 [cs.CL] Oct. 15, 2018 (15 pgs).
Ortega, J.L. Gomez, et al.: "A Machine-Learning Based Approach to Model User Occupancy and Activity Patterns for Energy Saving in Buildings", Science and Information Conference 2015, Jul. 25-28, 2015, London, UK (retrieved from www.conference.thesai.org (authorized licensed use limited to: Oracle. Downloaded on Jun. 20, 2024 at 17:25:44 UTC from IEEE Xplore) (9 pgs).
Adomavicius, Gediminas, et al.: "Expert-Driven Validation of Rule-Based User Models in Personalization Application", Data Mining and Knowledge Discovery, 5, 33-58, 2001, Kluwer Publishers, Manufactured in The Netherlands (26 pgs).
Sung Young Jung, et al.: "A Statistical Model for User Preference", IEEE Transactions on Knowledge and Data Engineering, vol. 17, No. 6, Jun. 2005 (10 pgs).
Kolomvatsos, Kostas, et al.: "A Proactive Statistical Model Supporting Services and Task Management in Pervasive Applications", IEEE Transactions on Network and Service Management, (Early On-line Publications) (doi:10.1109/TNSM.2022.3161663), Enlighten—Research publications by members of the University of Glasgow (13 pgs).
Md Salik Parwez, et al.: "Big Data Analytics for User-Activity Analysis and User-Anomaly Detection in Mobile Wireless Network", DOI 10.1109/TII.2017.2650206, IEEE, 1551-3202 (c) 2016 IEEE (8 pgs).
Iqbal H. Sarker, "AI-Driven Cybersecurity: An Overview, Security Intelligence Modeling and Research Directions", doi:10.20944/preprints202101.0457.v1, (c) 2021 by the author(s). Distributed under a Creative Commons CC BY license. (20 pgs).

* cited by examiner

INTAKE AND TRANSFORMATION PROCESS

GROUP-LEVEL ACTIVITY MODELING PROCESS

GROUP-LEVEL ANOMALY PREDICTION PROCESS

USER-LEVEL ACTIVITY MODELING PROCESS

USER-LEVEL ANOMALY (DEVIANCE) PREDICTION PROCESS

CHARACTERIZATION OF ACTIVITY OF USERS IN CLOUD APPLICATIONS AND SERVICES

BACKGROUND

Modern User and Entity Behavior Analytics (UEBA) relies on a wide range of information from various subsystems directly and indirectly related to the system or service to be protected by the UEBA-based solution. One source of data can be application or service logs detailing every request and response associated with user activity. Another source can be a database relating public IP addresses to a specific geographic location. Yet another source can be a reputation database providing cybersecurity related scores for IP address ranges and registered domain names.

Modern UEBA solutions may attempt to employ Machine Learning (ML) and Artificial Intelligence (AI) technologies for building comprehensive behavioral models of various actors on the network for known and unknown threats. However, incorporating progressively more and more aspects of user behavior in a single model makes such a model unwieldy—for example, larger models are much more difficult to train on realistic data to achieve sufficient levels of sensitivity and confidence, and the compute cost of training may increase quadratically, cubically, or still higher with the number of input features-thus limiting the applicability of larger models.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems, methods, and other embodiments are described herein that provide self-reliant characterization of activities of users in cloud applications and services. In one embodiment, an activity characterization system models user activity in two stages, and identifies deviant users as anomalous. At each stage, the activity characterization system self-selects optimal number of activities and assigns users to behavioral groups using a specialized clustering technique referred to herein as "escort clustering". And, at each stage, the activity characterization system identifies anomalous users based on the relative magnitude of deviation of user activities compared to other users from a same behavioral group. The size of the problems for activity modeling is substantially reduced by the two-stage approach to grouping and repeated use of escort clustering.

Therefore, the activity characterization system improves UEBA by enabling handling of large user datasets with large collections of distinct attribute tuples (which describe user actions). In another improvement to UEBA, in the activity characterization system the number of activities are determined automatically from the data without input from the operator. And, in another improvement to UEBA, the two-stage modeling of activities by the activity characterization system enable severity ranking of behavioral alerts to catch gross changes typically associated with external actors and subtle changes associated with insider activities and working under control.

No action or function described or claimed herein is performed by the human mind. An interpretation that any action or function can be performed in the human mind is inconsistent with and contrary to this disclosure.

—Example Activity Characterization System—

Figure 1:
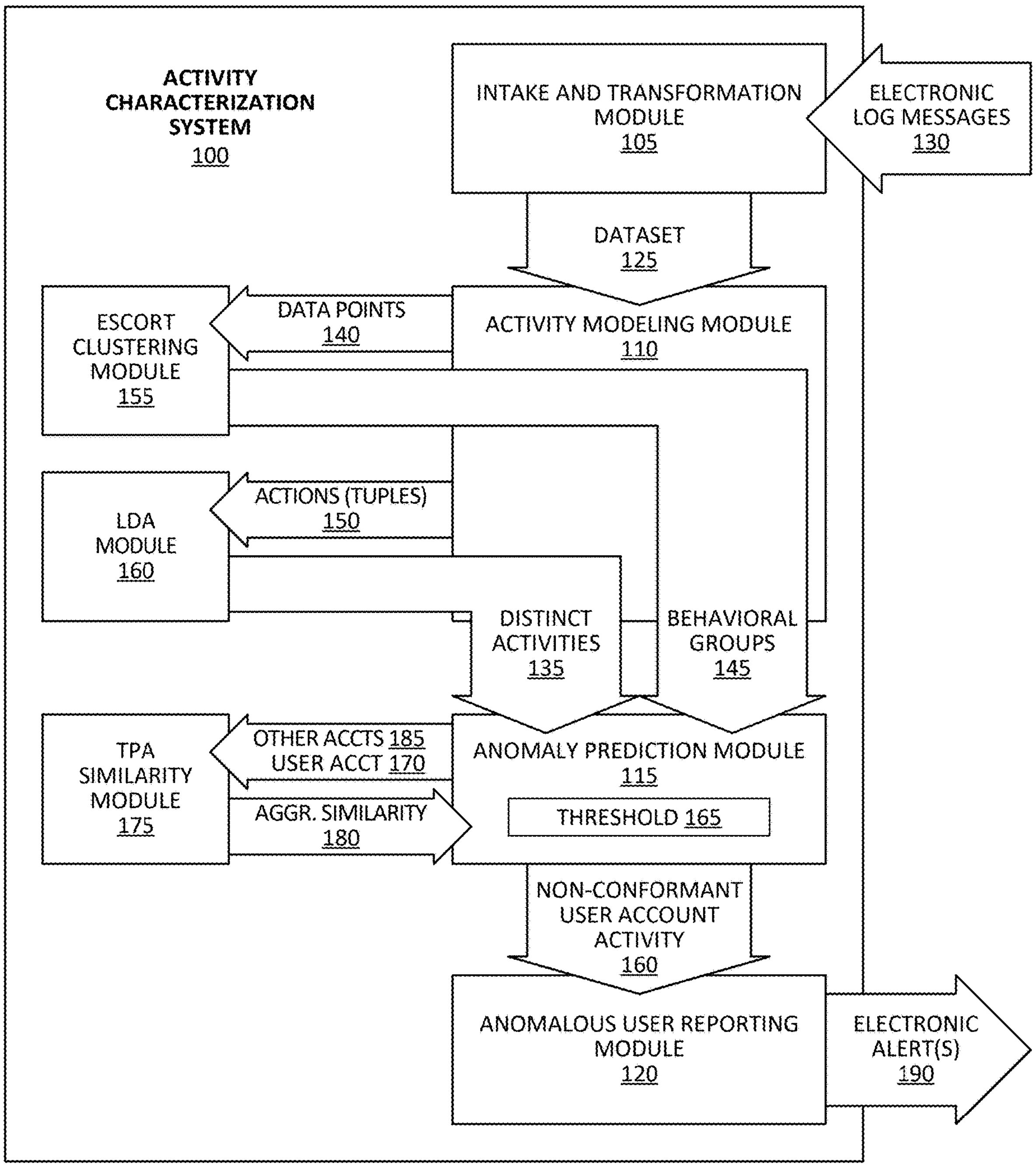
FIG. 1 illustrates one embodiment of an activity characterization system associated with self-reliant characterization of activities of users.

FIG. 1 illustrates one embodiment of an activity characterization system 100 associated with self-reliant characterization of activities of users. Activity characterization system 100 includes components configured for detecting non-conformant (e.g., anomalous or deviant) and potentially malicious user activity. In one embodiment, the components of activity characterization system 100 include an intake and transformation module 105, an activity modeling module 110, an anomaly prediction module 115, and an anomalous user reporting module 120.

In one embodiment, the activity modeling module 110 and anomaly prediction module 115 operate in two phases or stages. The two phases include a group-level phase and a user-level phase. At the group level phase, activity modeling module 110 and anomaly prediction module 115 operate to detect non-conformant activity that is anomalous with respect to the behavioral groups. At the user-level phase, activity modeling module 110 and anomaly prediction module 115 operate to detect non-conformant activity that is deviant with respect to users in a behavioral group. Thus, for example, the group-level phase operates to detect user activity that is grossly anomalous and differs substantially from all groups of activity. And, for example, the user-level phase operates to detect user activity that is subtly anomalous and is an outlier within an assigned group.

In one embodiment, intake and transformation module 105 is configured to generate a dataset 125 of data points 140 from a batch of electronic log messages 130. The electronic log messages 130 describe electronic actions taken by a plurality of user accounts. The batch covers a range of time, such as a day. Each data point in dataset 125 collectively describes those of the actions that are performed by a single user account. In one embodiment, a data point 140 is a bag of attribute-value tuples with counts of occurrences of the attribute-value tuple for the single user account. And, for example, the data point 140 may be represented by a sparse frequency vector of actions associated with term frequency-inverse document frequency values.

In one embodiment, activity modeling module 110 is configured to model or characterize distinct activities 135. The modeling is based on (i) escort clustering of the data points 140 (in dataset 125) into M behavioral groups 145, and (ii) inferring M or more distinct activities 135 from the dataset 125 by probabilistic activity modeling of the actions 150. The value of the number of behavioral groups M is derived from the dataset during the escort clustering.

In one embodiment, activity characterization system 100 includes an escort clustering module 155. Escort clustering module 155 is configured to partition similar ones of the data points 140 into clusters such as behavioral groups 145. For example, escort clustering module 155 is configured to generate first similarity values for one or more nearest neighbors of each data point of the dataset. Escort clustering module 155 is configured to generate second similarity values for one or more random neighbors of each data point of the dataset. Escort clustering module 155 is configured to recursively split the plurality of data points 140 into the behavioral groups 145 based on the first similarity values for the nearest neighbors. And, escort clustering module 155 is configured to stop the recursive splitting when the data points 140 are split into a total of M behavioral groups 145 based on the second similarity values for the random neighbors. The value of M is not set prior to the recursive splitting, and is instead inferred from the dataset 125 by the clustering process itself.

In one embodiment, activity characterization system 100 includes a latent Dirichlet allocation (LDA) module 160. LDA module 160 is configured to perform latent Dirichlet allocation—a form of probabilistic activity modeling—to infer the distinct activities 135 from the actions 150 in the dataset 125. For example, LDA module 160 is configured to perform probabilistic activity modeling by performing latent Dirichlet allocation of weights to actions 150 that occur in the dataset 125 to characterize a number of distinct activities 135. LDA module 160 is configured to determine that the distinct activities 135 are not sufficiently dissimilar based on diagonality of a similarity matrix of the distinct activities 135. LDA module 160 is configured to increase the number of distinct activities 135 and repeat the probabilistic activity modeling until the distinct activities 135 become sufficiently dissimilar based on the similarity matrix. At the group level, the number of distinct activities 135 is initially M, the number of the behavioral groups 145 inferred by escort clustering of the dataset 125. At a user level, the number of distinct activities 135 is initially T, a number of the actions 150 that have highest weights in one of the behavioral groups. In one embodiment, the subset of the actions 150 that have highest weights may be determined by escort clustering module 155 partitioning the actions univariately by weight.

In one embodiment, anomaly prediction module 115 is configured to predict activity of one or more user accounts to be non-conformant user account activity 160. The prediction is based on other accounts in a given one of the behavioral groups 145 satisfying a threshold 165 for similarity. Here, the behavioral group is the one of the M behavioral groups to which the one or more user accounts belong. The similarity is determined with respect to the one or more user accounts 170, for example by TPA similarity analysis. In general, activity characterization system 100 measures similarity by tri-point arbitration, determined for example by TPA similarity module 175. TPA similarity module 175 is configured to accept data points such as activity-probability distributions as points for comparison and as arbiter points. In tri-point arbitration, similarity values are expressed in a range between negative one indicating complete dissimilarity, and positive one indicating complete similarity. In one embodiment, the threshold 165 for similarity specifies that an aggregate tri-point arbitration similarity 180 of activity-probability distributions of the other accounts 185 with an activity-probability distribution of the user account 170 set as an arbiter point.

In one embodiment, anomalous user reporting module 120 is configured to generate an electronic alert 190. The electronic alert 190 indicates the one or more accounts that have non-conformant activity. In one embodiment, anomalous user reporting module 120 is further configured to determine whether the activity of an account that is non-conformant (i.e., non-conformant user account activity 160) has changed with respect to previous activity, and to include this information in the electronic alert 190. The electronic alert may be delivered to UEBA clients to inform decisions about the accounts that exhibit non-conformant user account activity 160.

Further details regarding activity characterization system 100 are presented herein. In one embodiment, operation of activity characterization system 100 to detect non-conformant user activity will be described with reference to example activity characterization method 200 and FIG. 2. In one embodiment, operation of intake and transformation module 105 will be described with reference to example intake and transformation process 300 and FIG. 3. In one embodiment, operation of activity modeling module 110 will be described with reference to example group-level activity modeling process 400 and FIG. 4 and example user-level activity modeling process 600 and FIG. 6. In one embodiment, operation of anomaly prediction module 115 will be described with reference to example group-level anomaly prediction process 500 and FIG. 5 and example user-level anomaly prediction process 700 and FIG. 7. In one embodiment, operation of escort clustering module 155 will be described with reference to example escort clusterer 410 and FIG. 8. In one embodiment, operation of TPA similarity module 175 will be described under the heading "TPA Similarity".

—Example Activity Characterization Method—

Figure 2:
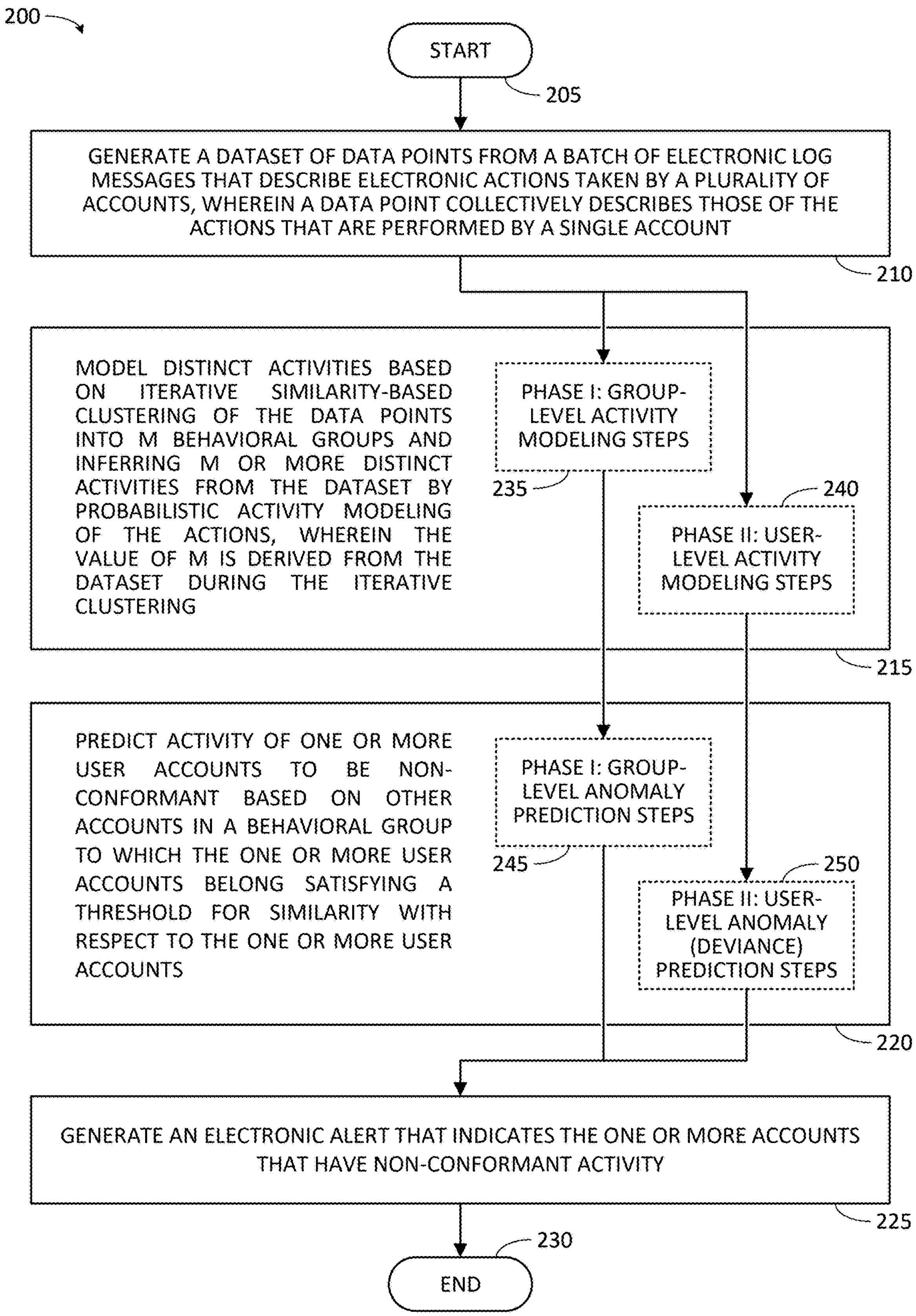
FIG. 2 illustrates one embodiment of an activity characterization method associated with self-reliant characterization of activities of users.

FIG. 2 illustrates one embodiment of an activity characterization method 200 associated with self-reliant characterization of activities of users. In one embodiment, as an overview, activity characterization method 200 converts batches of log messages into specially formatted data structures that describe individual actions performed by individual accounts. Then, activity characterization method 200 models or characterizes distinct activities that can be inferred from the actions, and uses them to predict or estimate whether activity of a user account is non-conformant (i.e., anomalous or deviant) with respect to activities of other user accounts. The detected non-conformant user accounts are reported to downstream UEBA analysis using electronic alerts. In one embodiment, the modeling and predicting (and, in some cases, electronic alerting) are biphasic, in which coarse-granularity detection of anomalous user activity occurs at the group level in a first phase, and in which fine-granularity detection of deviant user activity occurs at the user level in a second phase.

In one embodiment, activity characterization method 200 initiates at START block 205 in response to a activity characterization system determining that (i) a time interval has elapsed for collecting electronic log messages that describe electronic actions by accounts, (ii) a batch of electronic messages that describe electronic actions by accounts has become available for processing, (iii) an instruction to perform the activity characterization method 200 has been received by the activity characterization system; (iv) it is currently a time at which the activity characterization method 200 is scheduled to be run; or (v) activity characterization method 200 should commence in response to satisfaction of some other condition. In one embodiment, a computer system configured by computer-executable instructions to execute functions of activity characterization system 100 executes the activity characterization method 200. Following initiation at START block 205, activity characterization method 200 continues to block 210.

At block 210, activity characterization method 200 generates a dataset of data points from a batch of electronic log messages that describe electronic actions taken by a plurality of accounts. Here, a data point collectively describes those of the actions that are performed by a single account. The data point may be a vector representation (such as a sparse vector) of the collected actions performed by the single account. In one embodiment, at block 210, activity characterization method 200 performs a process for data collection and preprocessing, followed by an initial data transformation into a working dataset of per-user vector data points.

Intake and Preprocessing. In one embodiment, in the intake and preprocessing, the activity characterization system 100 collects log messages indicating user actions from various cloud applications. For example, the log messages may be accessed from various sources, such as application, service, and API logs. Log messages may be retrieved by query or poll of logs, or log messages may arrive as a stream. The log messages captures online actions of users and entities in the native formats of the applications.

Then, activity characterization system 100 extracts relevant attributes from the messages. For example, activity characterization system 100 executes a parser to capture relevant attributes and their associated values. The parser gathers values for attributes such as user account ID, URLs, source and destination IP addresses, resource names, message ID, timestamp, or other attributes used to describe actions.

And, activity characterization system 100 represents online actions as sets of attribute tuples associated with user account IDs. For example, activity characterization system 100 sorts and filters the extracted attribute tuples into individual bags (a data structure defined below) for each user account. Each bag represents a list of discrete actions corresponding to a particular user account. Each unique action is described by a unique set of attribute tuples. A unique action may be performed multiple times. A count or tally of the number of times an action is performed is associated in the bag with the set of attribute values for the action. Representation of the log data as sets of attribute tuples associated with users gives comprehensive lists of actions (attribute tuples) per account, with counts of the occurrences of each unique action.

Initial Data Transformation. In one embodiment, in the initial data transformation, the activity characterization system 100 transforms the extracted attributes into a numerical format using Term Frequency-Inverse Document Frequency (TF-IDF) calculations, for example as shown below with reference to EQs. 1-3. Each bag is transformed into a sparse frequency vector corresponding to an individual user account. This generates an output dataset in which each user account is represented by a sparse vector of attribute frequencies. In one embodiment, the sparse vectors may be normalized to a unit norm.

Each sparse vector has as many indexes (i.e., available positions) as the count of all unique attribute-value tuples in the set of bags. Each index in the sparse vector corresponds to a unique attribute-value tuple, and each value (at an index) in the sparse vector is the TF-IDF score for the corresponding unique attribute-value tuple of the index.

The TF-IDF transform thus converts the per-account lists of actions into a numerical format that is more convenient for subsequent clustering analyses. Each sparse vector describes a pattern of activity by a user account over a time interval for which the batch of log messages were obtained. The sparse vectors may be described more generally herein as "data points" of the dataset.

In one embodiment, operations of block 210 are performed by intake and transformation module 105. Additional detail on the generation of the dataset is described below with reference to intake and transformation process 300 of FIG. 3.

At block 215, activity characterization method 200 models distinct activities based on (i) escort clustering of the data points into M behavioral groups and (ii) inferring M or more distinct activities from the dataset by probabilistic activity modeling of the actions, for example using latent Dirichlet allocation (LDA). Note, the value of M is derived automatically from the dataset during the escort clustering, and may therefore be unknown or undefined in advance of performing the clustering. In one embodiment, at block 215, activity characterization method 100 performs a process for clustering the data points of the dataset into behavioral groups of similar activities, followed by a two-phase process of activity modeling, first at the group-level and second at the user-level.

Clustering. In one embodiment, the activity characterization system 100 applies an escort clustering technique to the dataset to group the user accounts into behavioral groups. Put another way, activity characterization system 100 executes an escort clusterer to group the sparse vector data points that are representative of the user accounts into distinct clusters. Each cluster represents a group of user accounts that exhibit similar behavior. The activity characterization system 100 determines the final number of behavioral groups (clusters) automatically by the escort clustering algorithm by inferring the number from the structure of the dataset. In one embodiment, the behavioral groups serve as the type-one vertices in a bipartite graph used for subsequent activity modeling. The operation of the escort clusterer is described in further detail below with reference to FIG. 8 under the heading "Escort Clustering".

Activity Modeling. In one embodiment, the activity characterization system 100 uses latent Dirichlet allocation (LDA) to model user activities. The LDA analysis models an individual activity as a distribution of actions (i.e., attribute-value tuples). In this way, the activities can be inferred from the dataset (or group) being analyzed, rather than defined in advance of the modeling analysis. The LDA algorithm is applied to the bipartite graph where type-one vertices represent behavioral groups and type-two vertices represent actions (i.e., attribute-value tuples). The LDA analysis further derives probabilities for groups or individual users. The probabilities are distributions of activities for the respective group or user. The term "distribution" refers to a probability distribution or histogram, for example expressed as a set of items (e.g., activities, actions) and the associated discrete probability of each item in the set. The LDA analysis iteratively updates activity assignments and distributions until convergence to ensure stable activity-tuple and group/user-activity distributions.

As mentioned above, modeling of activities may occur in two phases, first at a group level, and second at a user-level. Note that the clustering and activity modeling process may differ somewhat at the group-level and at the user-level phases.

Phase I: Group-Level Activity Modeling. During a first phase analysis at a group level, activity characterization system 100 performs phase I: group-level activity modeling steps 235, for example as follows. In one embodiment, the activity characterization system 100 detects group-level activities for the whole dataset. Activity characterization system 100 uses LDA to infer group-level activities of the dataset from the user account data points of the dataset. The group-level activities are represented as distributions over actions. The group-level activity modeling may then proceed to deriving group-level probabilities from the group-level activities, as discussed above.

Phase II: User-Level Activity Modeling. During a second phase analysis at a user level, activity characterization system 100 performs phase II: user-level activity modeling steps 240, for example as follows. These steps differ somewhat from the phase I: group-level activity modeling steps 235.

In one embodiment, the activity characterization system 100 detects user-level activities for each behavioral group (or for one or more of the behavioral groups). Again, activity characterization system 100 uses LDA to infer user-level activities of the behavioral group from the user account data points included in the behavioral group. The user-level activities are represented as distributions over actions (i.e., attribute-value tuples). Note that these user-level activities identified from data points in a behavioral group may differ from the group-level activities identified from the data points of the full dataset that includes multiple behavioral groups.

Then, in one embodiment, the activity characterization system 100 identifies within each behavioral group those user-level activities that are significant activities. The significant activities are in a highest range of weight with respect to other user-level activities of the behavioral group. In one embodiment, escort clustering may be applied to the user-level activities of the behavioral group to produce clusters based on weight, and the user-level activities in the cluster with highest weights may be considered significant activities. Note that this clustering is of activities, and not of the user account data points. The activity modeling is performed at the user-level for the users belonging to a behavioral group, using the identified significant activities for the behavioral group, and without using the other, non-significant activities. The activity characterization system may model user-level activities for each behavioral group in turn.

In one embodiment, operations of block 215 are performed by activity modeling module 110. Additional detail on the modeling of activities is described below with reference to group-level activity modeling process 400 of FIG. 4 and user-level activity modeling process 600 of FIG. 6.

At block 220, activity characterization method 200 predicts activity of one or more user accounts to be non-conformant (i.e., anomalous or deviant). The prediction is based on other accounts in a behavioral group (to which the one or more user accounts belong) satisfying a threshold for similarity with respect to the one or more user accounts. The predictions are made based on the activity modeling results from block 215. In one embodiment, at block 220, activity characterization method predicts whether activity of one or more individual user accounts is conformant or non-conformant with respect to the assigned behavioral groups for the individual user account. This determination is based on similarity or dissimilarity of the activity of the individual account to the activities of other user accounts in the assigned behavioral group. In one embodiment, activity characterization method 200 predicts conformance or non-conformance by generating per-user activity vectors, determining similarities of activity of behavioral group members with respect to individual users, and comparing the similarities with a threshold value for similarity that discriminates between conformant and non-conformant activity.

In one embodiment, activity characterization system 100 generates activity probability vectors for each user. These per-user activity probability vectors represent the distribution of each user over the set of activities identified in block by LDA in 215.

In one embodiment, activity characterization system 100 assesses the activity of individual user accounts with a tri-point arbitration (TPA) similarity analysis of activity of other members of the behavioral group to which the user account is assigned. The TPA analysis determines aggregate similarity of activity probability vectors of other members of the behavioral group with respect to the activity probability vector of the individual user account.

And, in one embodiment, activity characterization system 100 compares the aggregate similarity value that resulted from the TPA similarity analysis to a threshold. The threshold determines whether the activity of the user accounts is non-conformant (anomalous or deviant) with the behavioral group assigned to the user account. For example, an aggregate TPA similarity of other user accounts in the behavioral group with respect to the individual user account that is in excess of 0.5 may be used as a threshold to determine non-conformance of the individual user account. Satisfying the threshold indicates that the activities of the other accounts in the behavioral group are substantially more similar to themselves than they are to the activity of the individual user account, indicating that the individual user account is an outlier that does not conform with the behavioral group.

Phase I: Group-Level Anomaly Prediction. During a first phase analysis at a group level, activity characterization system 100 performs phase I: group-level anomaly prediction steps 245, for example as follows. Group-level anomaly prediction uses the group-level activities and probabilities derived from the whole dataset to predict user activity probability vectors at the group-level. The TPA analysis is based on the user activity probability vectors at the group-level. The comparison to the threshold is based on the aggregate similarity at the group-level. Non-conformance predicted at the group-level indicates significant deviations from the expected behavior of an entire behavioral group. Activity characterization system 100 assigns a label of "anomalous" to user accounts that are non-conformant at the group-level, indicating a higher score for alert severity.

Phase II: User-Level Anomaly Prediction. During a second phase analysis at a user level, activity characterization system 100 performs phase I phase I: user-level anomaly prediction steps 250, for example as follows. These steps differ somewhat from the phase I: group-level anomaly prediction steps 245.

User-level anomaly prediction uses the user-level activities and probabilities derived from one behavioral group dataset to predict user activity probability vectors at the user-level. In user-level anomaly prediction, the TPA analysis compares the activity of the individual user to activities of other users of the group at both the group-level and user-level. That is, in user-level anomaly prediction, the activity characterization system determines aggregate similarity of user-level and group-level activity probability vectors of other accounts in the behavioral group with respect to a user-level activity probability vector of an individual user account. The comparison to the threshold is based on the aggregate similarity at the group- and user-levels. Non-conformance predicted at the user-level indicates subtle deviations from the expected behavior of individual users within a behavioral group. Activity characterization system 100 assigns a label of "deviant" to user accounts that are non-conformant at the user-level, indicating a lower score for alert severity.

In one embodiment, operations of block 220 are performed by anomaly prediction module 115. Additional detail on the prediction of activities to be conformant or not is described below with reference to group-level anomaly prediction process 500 of FIG. 5 and user-level anomaly prediction process 700 of FIG. 7.

At block 225, activity characterization method 200 generates an electronic alert that indicates the one or more accounts that have non-conformant activity. In one embodiment, generation of the electronic alert includes composing and transmitting an electronic message.

Non-conformant user activity is potentially malicious, and is reported by the electronic alert to UEBA decisioning processes. And, based on the two-phase analysis, the non-conformant activity may be labeled either anomalous or deviant, indicating a higher or lower extent of non-conformance, respectively. An anomaly—indicating gross or substantial non-conformance with expected activity—is detectable in the first phase, group level analysis. A deviance—indicating subtle or minor non-conformance with expected activity—is detectable in the second phase, user-level analysis. The label indicating the extent of non-conformance may also be reported by the electronic alert to UEBA decisioning processes.

In one embodiment, activity characterization system 100 composes the electronic alert by accessing a template message; inserting information indicating the one or more accounts into the template message; inserting a state of conformance (such as conformant, non-conformant, anomalous, and deviant) for the respective one or more accounts into the template message; inserting an indication (such as a timestamp, batch number) of the interval or range of time associated with the alert into the template message; and inserting an electronic address of a UEBA client or other destination configured to act on the message into the template message in order to form an electronic alert message for transmission.

Then, in one embodiment, activity characterization system 100 transmits the electronic alert message to one or more destination systems configured to act on the message, such as a UEBA client. The electronic alert message may be configured for presentation on a display, and, in response to receiving the message, the receiving system is configured to display the message.

In one embodiment, the electronic alert message is configured to be transmitted over a network, such as a wired network, a cellular telephone network, wi-fi network, or other communications infrastructure. The electronic alert message may be configured to be read by a computing device. The electronic alert message may be configured as a request (such as a REST request) used to trigger initiation of an automated function in response to detection of anomalous behavior.

In one embodiment, in response to receiving the alert, the UEBA client can initiate automated actions to mitigate the risk, such as automatically forcing a logout or otherwise terminating a session of the anomalous user account, automatically requiring multi-factor authentication on subsequent login by the anomalous user account, or automatic update or even revocation of access privileges of the anomalous user account. Further, the alert may initiate an automatic notification to a security team, or initiate generation of a report describing the anomalous behavior. Thus, in response to receiving the electronic alert message, access to the cloud network may be automatically terminated or otherwise restricted for the user account exhibiting the non-conformant behavior.

In one embodiment, operations of block 225 are performed by anomalous user reporting module 120. Additional detail on the generation of the electronic alerts is provided below with reference to anomalous users reporter 545 of FIGS. 5 and 7.

In one embodiment, activity characterization method 200 repeats indefinitely in continual loop processing of subsequent batches of electronic log messages. Thus, at the completion of block 225, activity characterization method 200 may return to block 210 and repeat for a next batch. Or, activity characterization method 200 may complete and proceed to END block 230, where activity characterization method 200 concludes.

In one embodiment, at the conclusion of activity characterization method 200, an electronic alert has been generated that one or more user accounts that are performing activities that are not conformant with modeled, expected activity for the user accounts during a time interval covered by a given batch of log messages. Or, at the conclusion of activity characterization method 200, an electronic message may be generated that non-conformant activity has not been detected in the given batch. Advantageously, the detection of non-conformant activity need not rely on prior definition of what constitutes conformant activity by an external analyst. Instead, activity characterization method 200 improves over other activity monitoring processes by automatically determining from the dataset itself what activities are conformant and what activities are non-conformant. This enables the determination between conformant and non-conformant activity to automatically adapt and evolve along with the changing body of user account activity in a network environment.

—Further Embodiments of Example Activity Characterization Method—

In one embodiment, modeling distinct activities (see block 215) and predicting activity (see block 220) of one or more user accounts is performed in two phases, a group-level phase that detects non-conformant activity that is anomalous and a user-level phase that detects non-conformant activity that is deviant.

In one embodiment, modeling distinct activities (see block 215) includes steps to adjust the inferred activities iteratively until a convergence (shown by a level of dissimilarity between activities) is reached. The modeling includes performing the probabilistic activity modeling by latent Dirichlet allocation of weights to actions that occur in the dataset to characterize a number of distinct activities. The modeling includes determining that the distinct activities are not sufficiently dissimilar based on diagonality of a similarity matrix of the distinct activities. And, the modeling includes increasing the number of distinct activities and repeating the probabilistic activity modeling until the distinct activities become sufficiently dissimilar based on the similarity matrix. In one embodiment, at a group level, the number of distinct activities is initially M, the number of the behavioral groups inferred by escort clustering of the dataset. And, in one embodiment, at a user level, the number of distinct activities is initially T, a number of actions in one behavioral group that have highest weights.

Thus, in one embodiment, the modeling (see block 215) further includes latent Dirichlet allocation of weights to actions that occur in the dataset to characterize a number of distinct activities. In one embodiment, the modeling further includes performing the latent Dirichlet allocation with the number of distinct activities progressively increased until the distinct activities become sufficiently dissimilar based on diagonality of a similarity matrix of the distinct activities.

In one embodiment, escort clustering (see block 215) further includes steps for determining when the number of behavioral clusters Mis reached, and in response, automatically stopping the clustering. The clustering includes generating first similarity values for one or more nearest neighbors of each data point of the dataset. The clustering includes generating second similarity values for one or more random neighbors of each data point of the dataset. The clustering includes recursively splitting the plurality of data points into the behavioral groups based on the first similarity values for the nearest neighbors. And, the clustering includes stopping the recursive splitting when the data points are split into a total of M behavioral groups based on the second similarity values for the random neighbors, wherein the value of M is not set prior to the recursive splitting.

In one embodiment, escort clustering (see block 215) further includes steps for splitting the behavioral groups and automatically determining to stop. The clustering recursively splits the dataset into behavioral groups by spectral partitioning based on first similarities of nearest neighbors to the data points. And, the clustering terminates splitting at the M behavioral groups based on second similarities of random neighbors to the data points.

In one embodiment, similarity (see block 220) is measured by (that is, based on) tri-point arbitration. In one embodiment, similarity is measured by tri-point arbitration and expressed in a range between negative one indicating complete dissimilarity, and positive one indicating complete similarity.

In one embodiment, the data points (see block 210) are bags of attribute-value tuples (representations of actions) with counts of occurrences of the attribute-value tuples. In one embodiment, the data point is represented as a sparse frequency vector of actions associated with term frequency-inverse document frequency values.

In one embodiment, the activity characterization method 200 further includes determining whether the activity of an account that is non-conformant has changed with respect to previous activity.

In one embodiment, the threshold for similarity (see block 220) is an aggregate tri-point arbitration similarity of activity-probability distributions of the other accounts with an activity-probability distribution of the user account set as an arbiter point.

—UEBA Cybersecurity Context of Activity Characterization—

Methods, systems, and other embodiments of activity characterization techniques are disclosed herein. In one embodiment, the activity characterization techniques enable for self-reliant characterization of activity of users and entities of cloud applications and services for providing behavioral analytics to UEBA-empowered cyber defense solutions. In one embodiment, an activity characterization method identifies suspicious activities from individual users based on the relative conformance of their behavior compared to the behavior of a representative group of users that was automatically inferred by a clustering of log data. In one embodiment, an activity characterization system starts by clustering users and entities into groups of similar behaving entities based on the attribute values captured from activity logs of a cloud application or a service. The resultant behavioral groups are organized in specialized data structures for modeling group- and user-level activities and characterizing activities as conformal or deviating for consumption by UEBA-empowered cyber defense systems.

As discussed above, modeling many aspects of user activity in a single ML model suffers a number of disadvantages. An alternative, more attractive path creates and deploys specialized behavioral models that target specific aspects of user behavior (for example, as implemented by the activity characterization system). The specialized behavioral models may be re-usable models suitable for diverse UEBA environments with limited variety of data sources. Data sources with such limited variety may not be sufficient for training comprehensive behavioral models from the ground up, adding further utility to the re-usable models.

In approaches to activity modeling from logs based on topic modeling, as well as approaches that directly model activity such as rule-based models, statistical models, and ML models, the security system engineers face the problem of pre-selecting appropriate values for multiple parameters required during training ML and AI models. And, implementation engineers commonly lack sufficient ML background to optimally select the appropriate parameters.

Trying different combination of parameters to see which ones worked best on the previous data is computationally prohibitive and, what is worse, cannot be safely transmitted to different deployments. For example, deploying a ML-model-based UEBA solution in different regions may require substantially different sets of parameter values to adequately represent behavioral groups in each region as the number of systems and users and the character of workloads can substantially vary. Using rules of thumb or default values typically results in unfavorable rates of false and missed alarm rates which, in turn, increases cyber security operational expenses and reduces the effectiveness of detecting new types of malicious activities.

In one embodiment, the activity characterization system provides a self-reliant method of user activity classification that is free of user specified parameters. In one embodiment, the activity characterization system solves the above-mentioned problem of specifying the number of activities in advance by splitting activity modeling into two stages. At each stage, the number of activities is automatically selected based on the results of escort clustering, which automatically determines the optimal number of clusters from the data itself, without user input. This provides a significant advance in applying ML and AI (and other modeling) for practical and effective cyber security defense applications.

—Activity Characterization—Overview—

One overall goal of the activity characterization system is to transform the input, provided mostly in the form of log messages, into actionable UEBA intelligence using the self-reliant characterization of user and entity activity for cybersecurity defenses. In one embodiment, the activity characterization system implementing steps of an activity characterization procedure, as described herein.

In one embodiment, as a high-level overview, the activity characterization system performs the following steps and data transformations: dataset generation from log messages; group level activity modeling; group level anomaly prediction; user level activity modeling; and user level anomaly prediction. Thus, following initial data collection and processing, the activity characterization system performs activity modeling and anomalous activity detection first coarsely, for automatically identified activity groups of users, and then finely, for individual users with respect to their associated activity groups.

In one embodiment, the activity characterization system includes several interconnected subsystems, each of which subsystems performs a specific stage of transforming input information into actionable intelligence. In one embodiment, the subsystems are described in detail with reference to FIGS. 3-8 below. Also, an Illustrative Example of application of the activity characterization systems and methods to example data is provided below, under the heading "Illustrative Example". The Illustrative example is referred to occasionally in the following discussion of the activity characterization system.

—Activity Characterization—Dataset Generation from Log Messages—

Figure 3:
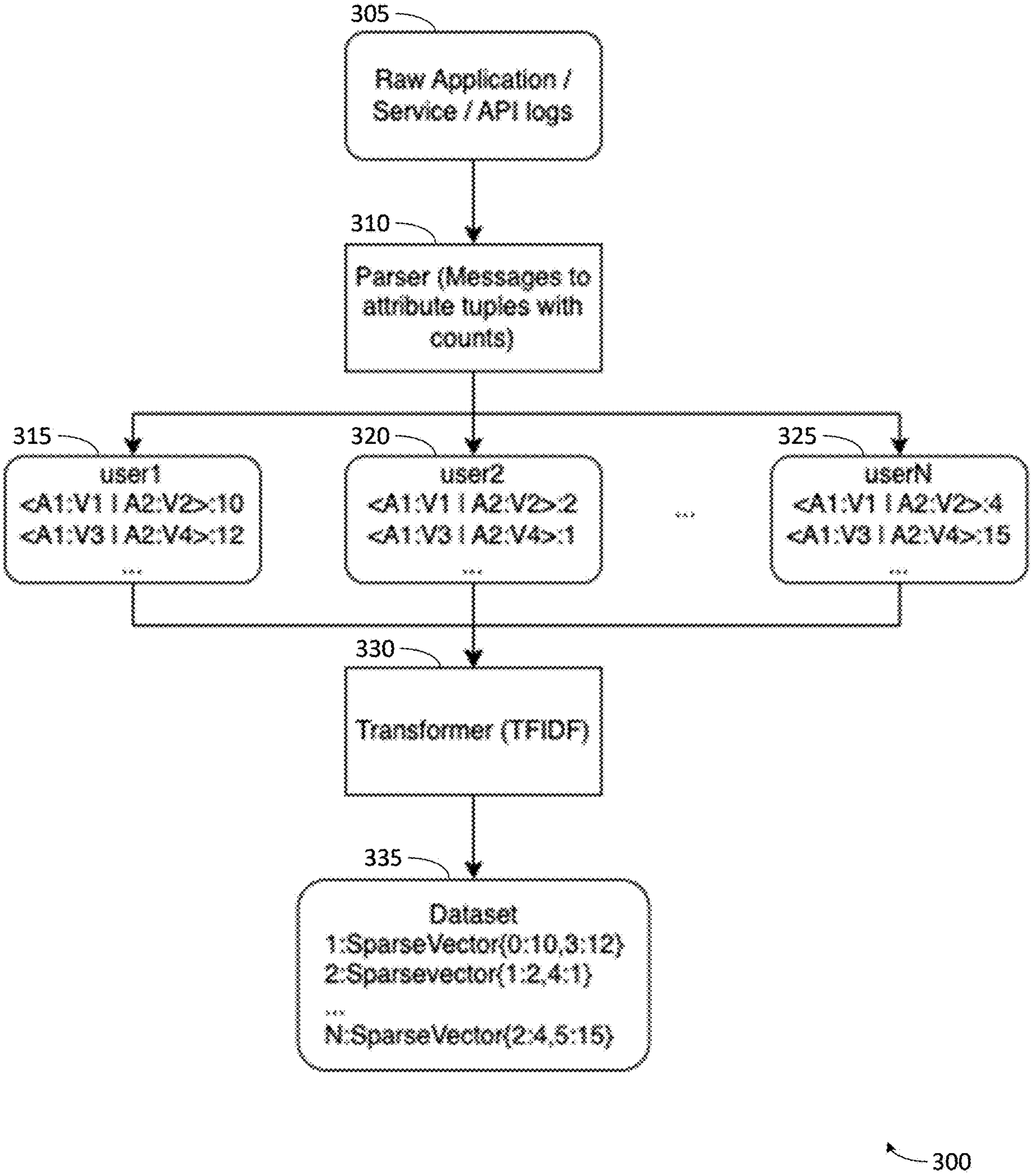
FIG. 3 illustrates one embodiment of an intake and transformation process of user activity data collection and normalization associated with self-reliant characterization of activities of users.

FIG. 3 illustrates one embodiment of an intake and transformation process 300 of user activity data collection and normalization associated with self-reliant characterization of activities of users. In intake and transformation process 300, activity characterization system 100 (i) parses raw log messages into attribute tuples with counts, (ii) sorts the attribute tuples with counts into tuple bags for individual users, and (iii) transforms the tuple bags into a dataset with one row per user (identity) and one column with a sparse Term Frequency—Inverse Document Frequency (TFIDF) frequency vector for the user.

In one embodiment, activity characterization system 100 is configured to access log messages 305. Log messages 305 may include application, service, and/or API log messages. Log messages 305 may be raw raw—that is, in a format that is native for their source application, and which may not necessarily be uniform from source to source. In one embodiment, log messages 305 may arrive as a stream. The log messages 305 capture online activity of users and entities of an application or service.

In one embodiment, activity characterization system 100 executes a parser 310 configured to extract relevant information from the log messages 305. Parser 310 accepts the stream of log messages 305 that capture online activity of users and entities of an application or a service. Parser 310 parses the log messages 305 to locate and retain particular attributes (e.g., $A_1$, $A_2$, . . . . AI) and associated values for the attributes (e.g., V1, V2, . . . . VJ), including a userID (or more generally, entityID) associated with the log message. Parser 310 sorts, filters, or otherwise distributes the attribute values into individual bags, such as user1 bag 315, user2 bag 320, on through user N bag 325. Each bag represents events corresponding to a uniquely identified entity, with the events of user1 bag 315 corresponding to activity by user1, and so on.

In one embodiment, activity characterization system 100 executes a transformer 330 configured to create a TFIDF dataset 335 of sparse frequency vectors of attribute tuples associated with individual users. For example, the bags (e.g., user1 bag 315, user2 bag 320, user N bag 325) are transformed into the TFIDF dataset 335 with rows corresponding to uniquely identified entities (e.g., users) and columns containing bags of attribute values, bags of co-occurrences of attribute values, and bags of derived features such as sequences of attribute values. Note, a bag, also referred to as a multiset, is a data structure for storing a collection of items where multiple occurrences (duplicates) of a same element is allowed. In one embodiment, the collection of elements stored in the bag is mapped to a same userID or other index, and may therefore also be considered to be a bucket data structure.

In one embodiment, parser 310 is configured to parse the received log messages 305 into identity information such as usernames or other identifying information and attribute values relevant to assessing user activity such as URLs, IP addresses, resource names, cookies, etc. The parser 310 also identifies the timestamp for features that rely on event interarrival times or time ordering of events. The input stream may include a series of one or more (P) log messages 305 (Mp):

Input stream: {M1, M2, . . . , MP}

In one embodiment, the activity characterization system 100 may process the input stream of log messages 305 in batches containing messages for an interval of time, such as a batch for the last hour, last one day, or another fixed period. In one embodiment, the overall activity characterization analysis is performed on each batch. In one embodiment, the activity characterization analysis can incorporate the information and results from previous batches for generating additional intelligence on changes in activity patterns of known users/entities.

An example log message M may include the following fields:

```
M={
  id: unique message identifier
  timestamp: the timestamp of the event
  username: user or entity name
  source_ip: the ip address of the end user device
  destination_ip: the ip address of the resource or service
  identity_info: additional identification info
  resource: some URL or other resource description
  attribute1: some other information
  attribute2: some other information
  ...
}
```

In one embodiment, the parser 310 extracts timestamp, username and relevant attributes ($A_1$, $A_2$, . . . . AI) with their values (e.g., V1, V2, . . . . VJ) from the log messages 305. From the extracted content of the log messages 305, parser 310 creates a bag (such as bags 315, 320, and 325) of attribute-value tuples with counts ($C_h$) observed co-occurrences of attribute values for each uniquely identified entity or username. For example:

```
Bag<username>{
  <A1:V11 | A2:V21 | ... | AI:VI1>:C1
  <A1:V12 | A2:V22 | ... | AI:VI2>:C2
  ...
  <A1:V1J | A2:V2J | ... | AI: VIJ >CH
}
```

where Ai:Vij are attribute-value pairs observed in the batch and associated with the unique username, where i is an index for the various attributes A, and where j is an index for various distinct values V that may occur for a given attribute. In one embodiment, each unique username is associated with their own bag with attribute-value tuples with counts.

As an illustration, a bag of tuples of two attributes for a database application user dbuser1 from the Illustrative Example may appear as follows:

```
Bag<dbuser1>{
   <select | table b> : 2
   <insert | table a> : 2
   <update | table a> : 1
   <update | table c> : 50
   <insert | table c> : 2
   <update | table b> : 1
   <insert | table b> : 1
}
```

The bag of tuples with counts is one example choice for UEBA features which can be used to obtain behavioral groups and model user activity. In one embodiment, the transformer 330 transforms the raw bags of tuples into sparse frequency vectors. In one embodiment, the transformer 300 performs the transformation using the Term Frequency—Inverse Document Frequency (TFIDF) method. Here, a bag may be considered to be somewhat analogous to a document, with an attribute-value tuple analogous to a word or term of the document, and the count associated with the tuple analogous to the term frequency.

Therefore, in one embodiment, transformation transformer 330 sums the counts for all tuples in the bag to get a total of tuple occurrences. Then, transformer 330 determines a term frequency (TF) (or, in this case, a tuple frequency) for each individual tuple t by dividing the count for the tuple by the total of tuple occurrences O across all tuples in the bag n, as shown in EQ. 1 below:

$$TF(t, b) = \frac{\text{count of tuple } t \text{ in bag } n}{\text{total number of tuple occurences } O \text{ in bag } n} \quad \text{EQ. 1}$$

TF(t,b) is thus a relative frequency of tuple t within bag b.

Transformer 330 then determines the inverse document frequency (IDF) (or, in this case, an inverse bag frequency) for each tuple. Transformer 330 by counts the total number of bags (N) produced by parser 310. For each tuple t in the set of bags (B), transformer 330 counts a number of bags that contain tuple t. Transformer 330 then determines the logarithm of the quotient of tuple t divided by number of bags that contain tuple t to determine the IDF, as shown in EQ. 2 below:

$$IDF(t, B) = \log\left(\frac{N}{|\{b : b \in B \text{ and } t \in b\}|}\right) \quad \text{EQ. 2}$$

IDF(t,B) is thus a logarithmically scaled inverse fraction of the bags B that contain the tuple t.

Transformer 330 then determines the TFIDF for each tuple by multiplying the TF for each tuple by the IDF for the tuple, as shown in EQ. 3 below:

$$TFIDF(t, b, B) = TF(t, b) \times IDF(t, B) \quad \text{EQ. 3}$$

TFIDF(t,b,B) is a statistical measure of how important a given tuple t is to a given bag b.

Transformer 300 then creates a sparse vector for each bag. Transformer 300 creates a vector having H indexes, where His the count of all unique tuples occurring in the set of bags B. Each of the indexes in the vector corresponds uniquely with one of the tuples occurring in the set of bags B. Each value in the vector is the TFIDF score for the tuple in the bag.

Transformer 300 then normalizes the vectors to a unit norm, for example by dividing the individual TFIDF scores of the vector by a collective length or norm of the vector. Thus, the TFIDF transformation performed by transformer 300 normalizes the raw bag features to remove bias towards larger bags and effect of common tuples.

In one embodiment, other UEBA feature choices may include bags of sequences of tuples with preserved order, various statistical indicators such as histograms and contingency tables. The bags can be additionally augmented with information from other data sources and inferred attributes. For example, an IP-to-location resolution can be performed, and the likely location of the end user or device can be added as a new attribute to the tuples. A device hardware type, operating system, or browser type associated with a user can be inferred from the raw data and supplied as another attribute.

In one embodiment, the activity characterization system generates and stores a map of tuples to the corresponding positions of the tuples in the sparse frequency vector:

$$T2FPOS = MAP < \text{Tuple, Position} >$$

In one embodiment, this map keeps the positions of all tuples for all users. The transformer 300 may use this map to build TFIDF sparse frequency vectors and use them as rows of dataset 335 returned as the result of the transformation of the input.

```
Dataset={
  SparseVector{Pos11:F11,Pos12:F12,...;length=size(T2FPOS)}
  SparseVector{Pos21:F21,Pos22:F22,...;length=size(T2FPOS)}
  ...
  SparseVector{PosN1:FN1,PosN2:FN2,...;length=size(T2FPOS)}
}
```

where Posij is the position in the sparse frequency vector and Fij is the TFIDF value for the tuples referenced by Posij. The length or size of the position map T2FPOS describes the dimensionality of the sparse vector space, i.e., the number of unique feature-value tuples. The correspondence of feature values to the position work together with the length to ensure that even when individual values are absent from individual sparse vector data points, the values for a particular feature will occupy a consistent position in the sparse vector across data points.

Referring to the Illustrative Example below, an example dataset with each row corresponding to one user and one column containing a sparse frequency vector may appear as follows:

```
Dataset={
  ...
  SparseVector(values={0=0.007, 1=0.005, 2=0.322, 3=0.012,
    4=0.016}, size=23)
  SparseVector(values={0=0.337, 1=0.005, 4=0.030, 5=0.027,
    6=0.010, 7=0.019}, size=23)
  SparseVector(values={0=0.007, 2=0.334, 8=0.015}, size=23)
  SparseVector(values={2=0.322, 3=0.037, 5=0.014}, size=23)
```

-continued

```
    SparseVector(values={0=0.007, 2=0.334, 8=0.015}, size=23)
    SparseVector(values={1=0.015, 2=0.306, 3=0.011, 5=0.028,
      8=0.014}, size=23)
      ...
  }
```

Each sparse frequency vector in the dataset 335 describes a pattern of activity uniquely associated with a userID over the course of batch interval of log messages 305. The sparse frequency vectors may also be referred to herein as "nodes" of the dataset 335. The dataset 335 of sparse frequency vectors that represent user activity features is used by the next subsystems to model activities and identify anomalous users.

—Activity Characterization—Group-Level Activity Modeling—

Figure 4:
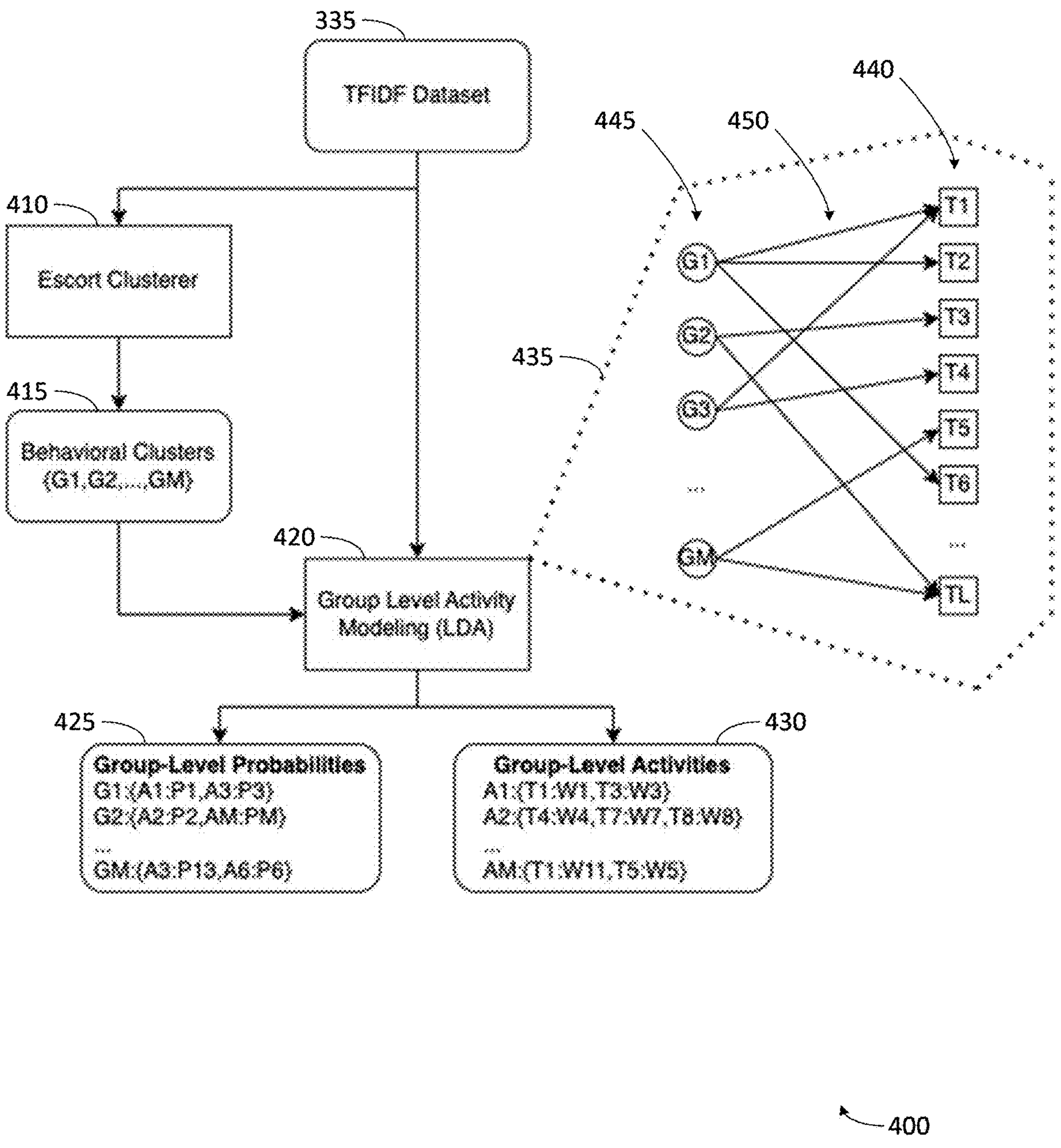
FIG. 4 illustrates an example group-level activity modeling process associated with self-reliant characterization of activities of users.

FIG. 4 illustrates an example group-level activity modeling process 400 associated with self-reliant characterization of activities of users. In group level activity modeling process 400, activity characterization system 100 (i) executes an escort clusterer 410 to identify behavioral clusters 415 within the dataset 335; and (ii) performs group level activity modeling 420 of the dataset 335 using the behavioral clusters 415 to produce group level probabilities 425 of users in a group performing a particular activity and group-level activities 430 that show the attribute tuple makeup of the distinct activities.

In one embodiment, at a high level, an escort clusterer 410 is run on the dataset 335 to automatically identify behavioral clusters 415 of the data nodes. And, the escort clustering automatically infers the number of user groups from the number of automatically identified clusters M. The escort clusterer 410 operates to put dissimilar users (in terms of the feature values in columns) into different behavioral clusters (or user groups) and similar users into same behavioral clusters (user group). The resultant behavioral clusters 415 represent dissimilar groups of activities by users. Therefore, the activity characterization system 100 selects at the first stage the number of groups to be the number of modeled activities for group-level activity modeling.

In one embodiment, activity characterization system 100 automatically determines the appropriate number of activities which are adequate to (i) characterize the activities of all users in the dataset 335 and (ii) identify anomalous users by first performing clustering of the dataset into behavioral groups 415 with escort clusterer 410 and then using the automatically determined number of behavioral groups M to guide the selection of the number of activities suitable for modeling user activities.

In one embodiment, escort clusterer 410 is configured to automatically determine an optimal number M of behavioral clusters and partition the dataset 335 into the optimal number M of behavioral groups 415. In one embodiment, escort clusterer 410 autonomously partitions the dataset 335. The partitioned dataset may be represented by placing the nodes representing particular users into sets representing particular clusters, for example as follows:

```
Dataset={
  BehavioralGroup1(U1,U2,U3,...)
  BehavioralGroup2(U4,U5,U6,...)
  ...
  BehavioralGroupM(U7,U8,U9)
}
```

As discussed in further detail below under the heading "Escort Clustering", the escort clusterer 410 partitions the dataset 335 into clusters with maximally similar frequency vectors in each cluster (i.e., infra-cluster similarity of frequency vectors is maximized) and maximally dissimilar vectors in different clusters (i.e., cross-cluster similarity of frequency vectors is minimized).

In one embodiment, activity characterization system 100 further performs group-level activity modeling 420 of the dataset 335 based on the behavioral groups 415. The activity characterization system 100 starts group-level activity modeling 420 with an initial number of activities K set to the number M of the behavioral groups 415. The reasonable assumption of selecting the number M as the initial number of activities K is that if there are M different behavioral groups, then there should be at least M different activities, with each distinct activity being dominant for only one behavioral group.

In one embodiment, group-level activity modeling 420 is configured to model group-level activity and identify anomalous activities. In one embodiment, group-level activity modeling 420 is self-reliant, in other words, is able to function independently on the dataset 335 without relying on additional inputs. Group-level activity modeling 420 starts with the given number of activities K=M. The group-level activity modeling 420 iteratively increases the number of activities K until all activities are dissimilar.

In one embodiment, group-level activity modeling 420 employs the Latent Dirichlet Allocation (LDA) algorithm to fit (i.e., model) user activities. As originally developed, the LDA was used for topic modeling, which is a process of discovering topics within a collection of documents. Each document is considered to be a mixture of various topics, and each topic is characterized by a distribution of words. LDA models topics as distributions over terms and models documents as distributions over activities.

In one embodiment of the activity characterization techniques described herein, the LDA algorithm is adapted to perform activity modeling, a process analogous to topic modeling which discovers activities (instead of topics) performed by a particular behavioral cluster of users (rather than a collection of documents). Each behavioral cluster may be represented as a mixture of various activities, and each activity may be characterized by a distribution of attribute-value tuples. The LDA algorithm is adapted here to model activities (at the group level) as distributions over attribute-value tuples, and model user behavior groups as distributions over activities.

In one embodiment, group level activity modeling 420 includes an LDA module. The LDA module is configured to execute the LDA algorithm to generate group-level activities 430—a model of user activities as probability distributions or histograms for actions (attribute-value tuples). And, the LDA module is configured to execute the LDA algorithm to generate group-level probabilities 425—a model of user behavior groups as probability distributions or histograms for group-level activities.

In one embodiment, the LDA module begins by initializing the model parameters, including the number of activities K, Dirichlet prior for activities ($\alpha$), and Dirichlet prior for attribute-value tuple distributions ($\beta$). The LDA module then iterates through each user, assigning initial random activity assignments to each tuple. For a given user n of the N users, activity distribution ($\theta_n$) represents the distribution of probability of a performance of a particular activity by the user n. For each of the N users, the LDA module samples the activity distribution ($\theta_n$) from the Dirichlet prior. For each attribute-value tuple in the bag of tuples for the user, the LDA module updates the activity assignment by sampling from a conditional distribution of the activity given the current activity-tuple and user-activity counts. For a given activity k of the K activities, the attribute-value tuple distribution ($\phi_k$) represents the distribution of probability of an occurrence of a particular tuple in the activity k. The LDA module then updates the attribute-value tuple distribution ($\phi_k$) for each activity k based on the activity assignments. This process repeats until convergence, resulting in stable activity-tuple and user-activity distributions that infer a hidden activity structure of dataset 235 that explains the observed behaviors of the users.

In one embodiment, group level activity modeling 420 runs the LDA algorithm on the data of a bipartite graph 435 that is built from the original dataset 235 (attribute tuples for each user extracted from logs) and behavioral clusters 415 (groups resulting from the clustering). In the bipartite graph 435, each behavioral group becomes a type one (left) vertex 445. And, each observed co-occurrence of attribute values becomes a type-two (right) vertex 440 of the bipartite graph 435. An edge 450 connecting a vertex of type-one to a vertex of type-two is assigned a weight. In one embodiment, the weight is equal to the number of times the co-occurrence of attribute values was observed for the users that fall into that group.

An activity is modeled (or otherwise characterized) as a distribution over type-two vertices 440 of the constructed bipartite graph 435. A behavioral group of users, represented by a type-one vertex 445 of the bipartite graph, is modeled as a distribution over activities.

After the first stage activities, called group-level activities, are learned, the system uses Escort similarity computation on the activities to verify that all activities are dissimilar. The activity characterization system 100 expects to see at least as many dissimilar activities as there are dissimilar behavioral groups. The number of groups M is therefore used as an initial seed for the number of activities. In one embodiment, the LDA algorithm is used to learn activities from the constructed bipartite graph 435. As mentioned above, an activity is defined as a distribution over the type-two vertices 440. Then, each type-one vertex 445 is considered as an archetype of users with certain behavior and is modeled as a distribution over activities. The LDA algorithm fits these distributions into the bipartite graph.

Group level activity modeling 420 builds bipartite graph 435 by aggregating tuples (type two vertices 440) in each behavioral group (type one vertices 445) belonging to the set of behavioral clusters 415. (Note, the nouns "cluster" and "group" as used herein are synonymous.) In one embodiment, bipartite graph 435 (of group-level activity) may be expressed as follows:

```
GroupBipartiteGraph<Dataset,G1,...,GM>{
  {G1,...,GM}
  {T1,T2,T3,...,TL}
  {E1,E2,...,EX}
}
```

The set of behavioral clusters 415 {G1, . . . , GM} are shown in bipartite graph 435 as left vertices 445, with one vertex for each behavioral group. The set of attribute value tuples {T1, T2, T3, . . . , TL} for dataset 235 are shown in bipartite graph 435 as type two vertices 440, with one vertex for each tuple from T2FPOS.keySet. The set of edges {E1, E2, . . . , EX} connecting type one vertices 445 to type two vertices 440 are shown in bipartite graph 435 as edges 450. Each edge $E_x$ of the edges 450 has a weight $W_x$ which is a function of the aggregated count of the tuple (right vertex) in a behavioral group (left vertex).

In one embodiment, the result of the LDA algorithm is a collection of M group-level activities 430 and a collection of group-level probabilities 425 of each activity for each behavioral group (type one vertex). The collection of M group-level activities 430 may be expressed as follows:

```
GroupActivities = {
  A1(T1:W11,T2:W12,...)
  A2(T1:W21,T2:W22,...)
  ...
  AM(T1:WM1,T2:W22,...)
}
```

The collection of group-level probabilities 425 of each activity for each behavioral group may be expressed as follows:

```
GroupProbabilities = {
  G1(A1:P11,A2:P12,...,AM:P1M)
  G2(A1:P21,A2:P22,...,AM:P2M)
  ...
  GM(A1:PM1,A2:PM2,...,AM:PMM)
}
```

If after a first iteration all activities are dissimilar, group level activity modeling 420 stops or otherwise terminates further iterations, and returns the current activities as group level activities 430. If after the first iteration some activities are similar, group level activity modeling 420 increases the number of activities K by 1 (or by another fixed increment) and repeats the learning procedure.

If the number of dissimilar activities is less than the number of behavioral groups, the system increases the number of specified activities and repeats the activity learning procedure. The system repeats these actions until there are at least as many dissimilar activities as there are behavioral groups. This completes the building group-level activities through self-reliant approach.

In one embodiment, group level activity modeling 420 includes a similarity assessor module that is configured to determine pairwise similarity of activities in a collection of activities, populate a similarity matrix with the resulting values of pairwise similarity, and determine whether the activities are sufficiently dissimilar based on the diagonality of the similarity matrix. The similarity assessor module determines whether or not the collection of activities has isolated the complete set of dissimilar activities.

In one embodiment, the pair-wise similarity of activities in a collection of activities (in which the activities are represented as distributions) are computed using the TPA similarity approach, as discussed below under the heading "TPA Similarity".

Given a collection of activities (such as group level activities 430), the similarity assessor module computes an activity similarity matrix of similarities between the available pairs of activities in the collection. Here, the similarity matrix is a square matrix used to represent the similarity between the pairs of activities. Each element $S_{ij}$ in the matrix denotes the TPA similarity between activities i and j. The activity similarity matrix is "diagonal" when the activity similarity matrix has positive TPA similarity values only on the diagonal positions i=j, with all off-diagonal TPA similarity values being zero or lower. Expressed mathematically, for an activity similarity matrix S, $S_{ij}\leq$for $i\neq j$ and $S_{ii}>0$. In an activity similarity matrix that is fully diagonal, each activity is similar only to itself, and not similar to any other activity. The diagonal elements $S_{ii}$ represent the self-similarity of each activity, which is typically the highest possible value of 1 for TPA similarity.

If the activity similarity matrix is close to diagonal, the similarity assessor module signals the sufficient dissimilarity of all activities. The similarity matrix may be "close to" diagonal where activities are fully self-similar (with a TPA similarity value of 1), and the off-diagonal similarity values satisfy one or more conditions for "closeness" to diagonality. One condition for closeness to diagonality may be that no off-diagonal similarity values exceed a cutoff threshold, for example a TPA similarity value moderately in excess of 0, indicating slight similarity between activities. For example, the cutoff threshold may be a TPA of 0.2 or lower, or more restrictively, a TPA of 0.1. Another condition for closeness to diagonality may be that the count of off-diagonal similarity values in excess of 0 is a small proportion of the size of the similarity matrix, for example less than 5 percent—or more restrictively, less than 1 percent—of the off-diagonal values are in excess of 0.

If the similarity assessor module determines that the similarity matrix is not sufficiently close to diagonal, group level activity modeling 420 reiterates to better isolate the activities. And, if the similarity assessor module determines that the similarity matrix is sufficiently close to diagonal, a set of activities has been achieved that is satisfactorily dissimilar. After the iterations complete the group level activity modeling 420 has produced a final collection of group-level activities.

Referring again to the illustrative example below, the result of the activity modeling at the group level (group level probabilities 425 and group level activities 430) as guided by escort clusterer 410 can be as follows:

```
GroupActivities = {
  A0(2:0.903, 1:0.016, 3:0.014)
  A1(15:0.185, 11:0.183, 12:0.181)
  A2(22:0.231, 21:0.224, 7:0.117)
  A3(0:0.831, 6:0.022, 10:0.021)
  A4(1:0.775, 5:0.024, 14:0.022)
}
GroupProbabilities = {
  G1(A0:2.4E-4, A1:0.99, A2:1.8E-4, A3:1.8E-4, A4:1.6E-4)
  G2(A0:2.8E-4, A1:2.3E-4, A2:2.1E-4, A3:2.1E-4, A4:0.99)
  G3(A0:0.99, A1:1.3E-4, A2:1.2E-4, A3:1.2E-4, A4:1.1E-4)
  G4(A0:3.0E-4, A1:2.5E-4, A2:0.99, A3:2.3E-4, A4:2.1E-4)
  G5(A0:2.7E-4, A1:2.3E-4, A2:2.0E-4, A3:0.99, A4:1.9E-4)
}
```

Note there is one dominant activity per behavior group, which is emphasized in bold. This is consistent with the data model provided in the illustrative example.

The result of group-level activity modeling process 400—group level probabilities 425 and group level activities 430—is used by a group-level anomaly prediction process 500 to predict user activities for behavioral groups and determine deviant users at the group level.

—Activity Characterization—Group-Level Anomaly Prediction—

Figure 5:
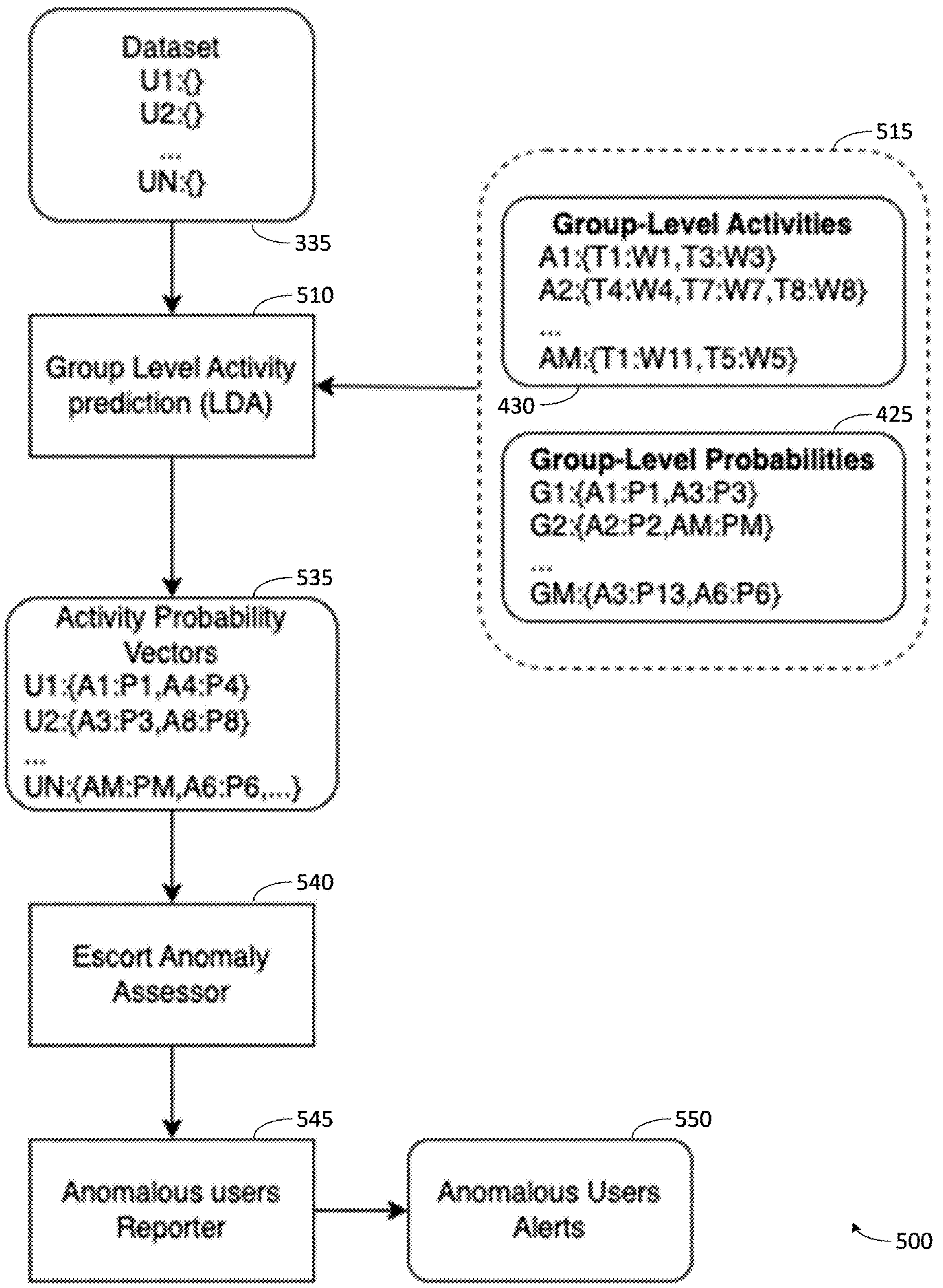
FIG. 5 illustrates one embodiment of a group-level anomaly prediction process associated with self-reliant characterization of activities of users.

FIG. 5 illustrates one embodiment of a group-level anomaly prediction process 500 associated with self-reliant characterization of activities of users. In group-level anomaly prediction process 500, activity characterization system 100 (i) performs a group level activity prediction 510 on the dataset 335 based on the modeling results 515 (group-level probabilities 425 and group-level activities 430 from group level activity modeling process 400) to generate per-user activity probability vectors 535 for the group-level probabilities and activities; (ii) executes an anomaly assessor 540 to detect whether activity of individual users is deviant with respect to the group; and (iii) executes an anomalous users reporter 545 in response to detecting one or more deviant users to produce anomalous users alerts 550. Group level anomaly prediction process 500 thus operates as a predictor of users that exhibit activity that is deviant from expected activity at the group level.

The final group-level activities 430 and group-level probabilities 425 are used by the activity characterization system 100 to predict activities of each individual user in the dataset 335 by using the LDA algorithm with specified group-level activities 430. The result of prediction is the representation of each user as a distribution over activities, represented here as activity probability vectors 535. The predicted user probabilities are collected into a UserProbabilities data structure, for example as follows:

```
UserProbabilities = {
  U1(A1:P11,A2:P12,...,AM:P1M)
  U2(A1:P21,A2:P22,...,AM:P2M)
  ...
  UN(A1:PN1,A2:PN2,...,AM:PNM)
}
```

Following along with the illustrative example given below, users in the illustrative example are predicted to have activity probability distributions as follows:

```
UserProbabilities = {
  ...
  dbuser27(A0:0.02, A1:0.001, A2:0.001, A3:0.001, A4:0.96)
  dbuser26(A0:0.01, A1:0.001, A2:0.001, A3:0.97, A4:0.001)
  dbuser25(A0:0.002, A1:0.001, A2:0.001, A3:0.001, A4:0.99)
  dbadmin2(A0:7.9E-4, A1:6.5E-4, A2:0.99, A3:6.0E-4, A4:5.4E-4)
  dbuser1(A0:0.002, A1:0.001, A2:0.001, A3:0.99, A4:0.001)
  ...
}
```

Note that the dominant activity of database administrators (such as dbadmin2) is different from the dominant activity of ordinary database users, which is consistent with the example data model.

The group-level anomaly prediction process 500 executes an anomaly assessor 540 on the activity probability vectors 535. Anomaly assessor 540 is configured to identify anomalous users based on the distribution of the user over the group level activities (as recorded in a probability vector for the user). In one embodiment, anomaly assessor 540 is an escort anomaly assessor that implements an anomaly detection analysis based on tri-point arbitration. At a high level, a given user u is anomalous with respect to the other users in the activity probability vectors 535 when, for each behavioral group, a TPA similarity between the activity probability vectors of users in the behavioral group calculated with the activity probability vector $U_u$ for a given user u as the arbiter point satisfies a threshold.

When using TPA similarity analysis for anomaly detection, an anomalous point may be defined as an arbiter point for which all points in a nominal sample have a similarity above a given threshold. Stated differently, an anomaly is a data point for which all pairs of data points in a nominal sample cluster have a higher similarity with respect to each other than with respect to the data point. Anomaly assessor 540 is therefore configured to use the activity probability vector $U_u$ for user u as the arbiter point for a TPA similarity analysis of the individual behavioral groups. The anomaly assessor 540 determines if U is an anomaly by determining if a TPA similarity $S_U$ between points in each cluster, as determined using $U_u$ as the arbiter point, is above a threshold $t_\alpha$. In one embodiment, the threshold $t_\alpha$ is driven by a pre-specified false error rate α. Generally, setting $t_\alpha$=0.5 will assure a false detection rate α of less than 1%, which is satisfactory for most implementations.

In one embodiment, anomaly assessor 540 determines an activity probability vector $U_u$ (i.e., distribution over group-level activities) for user u to be anomalous with respect to the M behavioral clusters 415 $G_M$ when the constraint shown in EQ.4, below, is satisfied:

$$Anom(U_u|G_M) = \frac{1}{M}\sum_{k=1}^{M}\sum_{i,j} S(r_i, r_j|U_u) > t_\alpha,\ i,\ j:\ r_i, r_j \in G_k \qquad \text{EQ. 4}$$

The TPA similarity function S is given by EQ. 5 below.

In one embodiment, anomaly assessor 540 evaluates the activity probability vector $U_u$ for each of the N users (u=(1, 2, . . . , N)). Anomaly assessor 540 records the user IDs of those users u having probability vectors $U_u$ that satisfy the constraint of EQ. 4 as anomalous (or deviant) users. For example, anomaly assessor 540 may store the anomalous users in a list or other data structure. In this way, group-level anomaly prediction process 500 identifies anomalous users based on their distributions over group-level activities using the anomaly assessor 540.

In one embodiment, the prediction of the activity of users is performed on activities learned from the same batch of data (dataset 335) from which the user activity is extracted. In one embodiment, prediction of the activity of users is performed on activities learned from the previous batches to identify significant deviations of user behavior with respect to prior activity (which can happen when the user account gets compromised).

In one embodiment, anomalous users reporter 545 is configured to generate anomalous users alerts 550. In response to the detection of one or more group-level anomalous users by anomaly assessor 540, anomalous users reporter 545 generates a report of the group-level anomalous users. For example, anomalous users reporter 545 retrieves the list of anomalous users and composes an electronic message that includes the list of anomalous users. The anomalous users reporter 545 then transmits the electronic message as an anomalous users alert 550.

In general, the users that are found to be anomalous at the group-level are grossly anomalous because their activity significantly differs from the expected group level activities of the given behavioral group. In one embodiment, the anomalous users alert 550 may further include an alert severity score in association with the anomalous users. The anomalous users reporter 545 assigns group-level anomalous users to have high alert severity scores, reflecting the large extent of anomalous deviance from expected group level activities.

—Activity Characterization—Second Stage, User-Level Analysis—

Following the first stage of activity modeling and anomaly prediction at the group level, the activity characterization system 100 proceeds to a second stage of activity modeling and anomaly prediction at an individual user level. Similar activity characterization analyses to the first stage analyses that assessed similarity of activities, incremented the number of activities and iterations of user activity modeling at the group level (as described above in the "Group-Level Activity Modeling" and "Group Level Anomaly Prediction" sections with reference to FIGS. 4 and 5) are applied in the second stage at the user-level within behavioral groups. The results of user-level activity modeling at the second stage are collections of activities and probabilities for users in each behavioral group. The second stage captures more subtle deviations in user activity that may nevertheless be anomalous and indicative of malicious activity.

For example, in the second stage, the escort anomaly assessor 540 is applied in a manner similar to that described above to the first stage, group-level results (group-level probabilities 425 and group-level activities 430) for each group to model activity and to determine anomalous users at the user-level. As above, the anomalous users reporter 545 reports the anomalous users that are discovered by the second-stage, user-level activity characterization analysis. In one embodiment, as with group-level, the predictions for each user may be made using the same batch of data used for building activities, while using the activities from previous batches to additionally identify changes in user activities with respect to previous activity.

—Activity Characterization—User-Level Activity Modeling—

Figure 6:
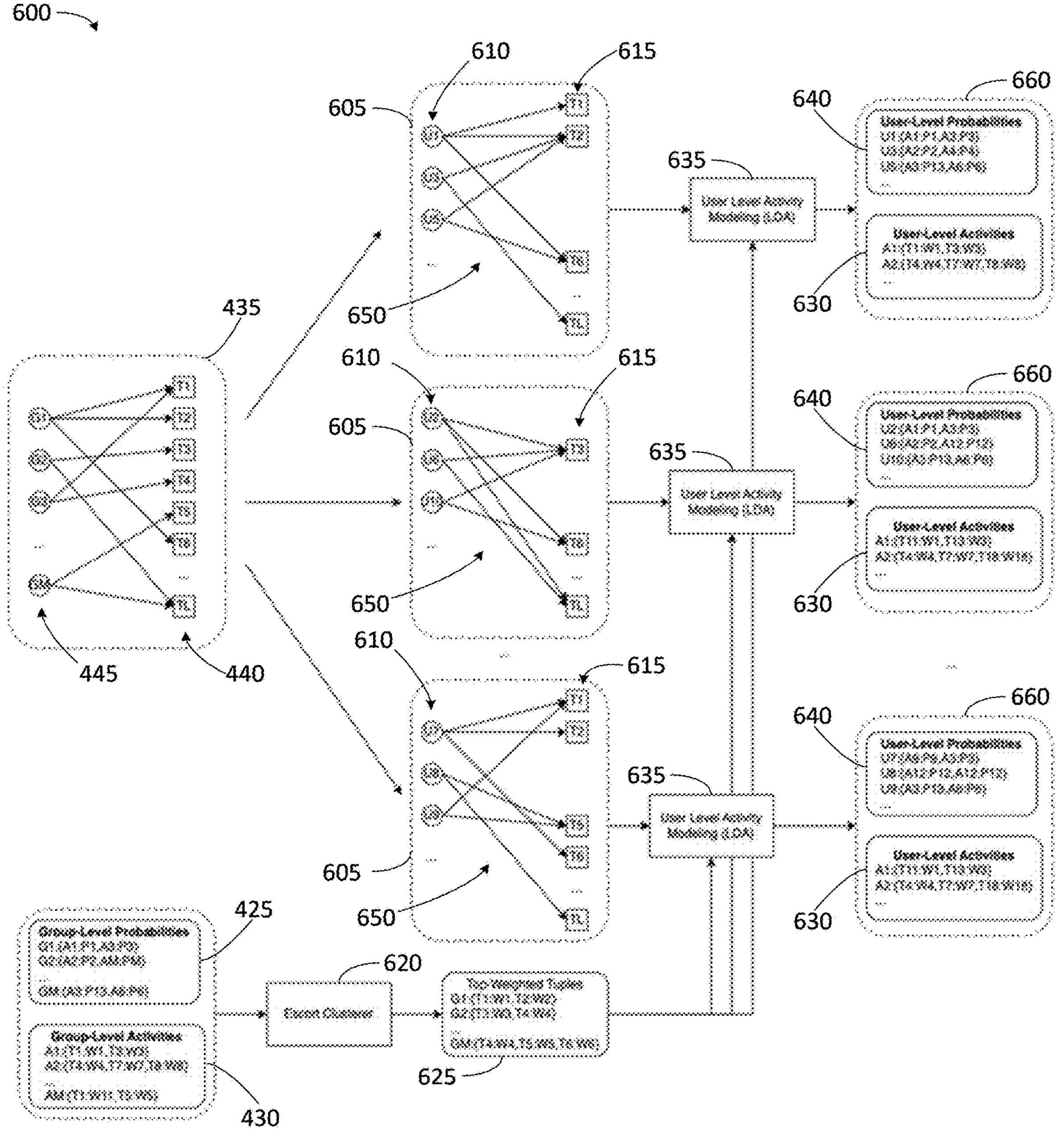
FIG. 6 illustrates one embodiment of a user-level activity modeling process associated with self-reliant characterization of activities of users.

FIG. 6 illustrates one embodiment of a user-level activity modeling process 600 associated with self-reliant characterization of activities of users. User-level activity modeling process 600 is more sensitive than group level and may be more appropriate for detection of such malicious activity cases as insider and working under control.

In one embodiment, at the second stage the original bipartite graph 435 is split into a number M of bipartite graphs 605—one bipartite graph for each behavioral group 415. Each user belonging to a behavioral group becomes type-one (left) vertex 610 of the bipartite graph 605. Type-two vertices 615 still represent attribute tuples, although in one embodiment not all attribute tuples need be included in the bipartite graph 605.

The group level activities 430 are further used to guide the user-level activity modeling process 600. In particular, an escort clusterer 620 is configured to act as an identifier of top weighted tuples 620 in group-level activities. Group level activity modeling process 600 then analyzes bipartite graphs 605 to learn user-level activities 630. In one embodiment, user-level activity modeling 635 learns the user-level activities 630 using the LDA algorithm (in a manner similar to that described for group level activity modeling 420 above).

In one embodiment, the user-level activity modeling 635 includes an LDA module. The user-level activity modeling 635 is configured to execute the LDA algorithm to generate user-level probabilities 640 and user-level activities 630 for each group, in a manner similar to that described above for group-level activity modeling 420.

The group level bipartite graph 435 GroupBipartiteGraph is expanded from the left to have one type one (left) vertex 610 for each user and is split into M bipartite graphs 605, one for each behavioral group, as follows:

```
UserBipartiteGraph<Dataset,G1>{
   {U1,U3,U5...}
   {T1,T2,T6,...,TL1}
   {E1,E2,...,EX1}
}
UserBipartiteGraph<Dataset,G2>{
```

-continued

```
    {U2,U6,U10...}
    {T3,T6,...,TL2}
    {E3,E4,...,EX2}
}
...
UserBipartiteGraph<Dataset,GM>{
    {U7,U8,U9...}
    {T1,T2,T5,T6,...,TLM}
    {E5,E6,..., EXM}
}
```

The sets of users {U1, U3, U5 . . . }, {U2, U6, U10 . . . }, and {U7, U8, U9 . . . } belonging to behavioral groups G1, G2, and $G_M$, respectively, are shown in bipartite graphs 605 as type one (left) vertices 610. In the bipartite graph 605 for a given behavioral group, there is one type one vertex for each user in the given behavioral group. The sets of attribute value tuples {T1, T2, T6, . . . , $TL_1$}, {T3, T6, . . . , $TL_2$}, and {T1, T2, T5, T6, . . . , $TL_M$} belonging to behavioral groups G1, G2, and $G_M$, respectively, are shown in bipartite graphs 605 as type two (right) vertices 615. In the bipartite graph 605 for a given behavioral group, there is one type two vertex 615 for each tuple from T2FPOS.keySet that is exhibited by the users in the given behavioral group. The sets of edges 650 {E1, E2, . . . , $EX_1$}, {E3, E4, . . . , $EX_2$}, and {E5, E6, . . . , $EX_M$} belonging to behavioral groups G1, G2, and $G_M$, respectively, are the sets of edges connecting type one vertices to type two vertices in the respective bipartite graphs 650. Each of edges 650 is assigned a weight.

The activity characterization system 100 specifies the number of activities based on a number T of type-two vertices that have highest weights in the group-level activity associated with the group. The escort clusterer 620 is used to identify the number T of top-weighted tuples for each behavioral group from the group-level activity modeling results. Escort clusterer 620 is configured to perform escort clustering of values of the entries of the activity vector, for example as discussed above with reference to escort clusterer 410. Given a vector of weights, [W1, . . . . Wn], escort clusterer 620 places weights with similar magnitude into the same cluster. Escort clusterer 620 thus performs automatic grouping of similar values for the tuples.

The activity characterization system 100 then selects the group of similar values in which the values are maximally large to be the top-weighted values. For example, escort clusterer 620 selects the cluster of tuples containing the weight with largest magnitude and uses the number of members of that cluster as the number T of top-weighted clusters. This is done automatically without any input from the operator specifying thresholds or other parameters to identify the cut-off probability of top-weighted tuples.

The identified number T of top-weighted tuples in activities of each behavioral group are used to specify an initial number of activities Ku for user-level activity modeling. The reasoning is that at user-level in each behavioral group there can be at least as many user-level activities as the number of top-weighted tuples.

The user-level modeling results 660—collections of user-level activities 630 and user-level probabilities 640 corresponding to individual behavioral groups 415—may be used by a user-level anomaly prediction process to predict activities for individual users and determine deviant users at the user level.

—Activity Characterization—User-Level Anomaly Prediction—

Figure 7:
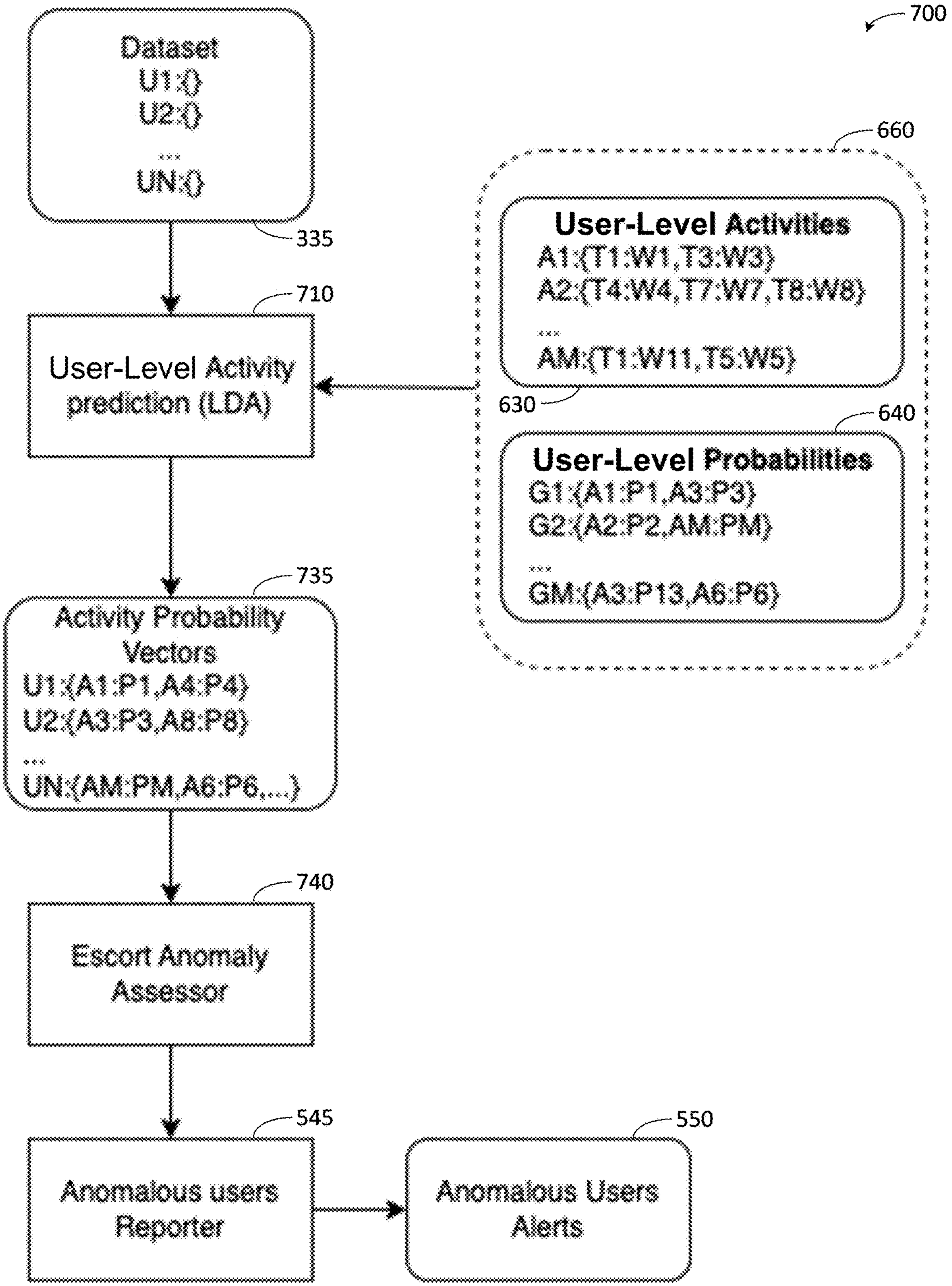
FIG. 7 illustrates one embodiment of a user-level anomaly prediction process associated with self-reliant characterization of activities of users.

Similar to the first stage, group-level analysis, in the second stage, user-level analysis, anomaly prediction follows activity modeling. FIG. 7 illustrates one embodiment of a user-level anomaly prediction process 700 associated with self-reliant characterization of activities of users. In user-level anomaly prediction process 700, activity characterization system 100 (i) performs a user-level activity prediction 710 on the dataset 335 based on the user-level modeling results 660 (user-level activities 630 and user-level probabilities 640) for the various behavioral groups 415 to generate per-user activity probability vectors 735 for the user-level activities and probabilities; (ii) executes an anomaly assessor 740 to detect whether activity of one or more individual users is deviant with respect to its assigned behavioral group; and (iii) executes anomalous users reporter 545 in response to detecting one or more deviant users to produce anomalous users alerts 550. Thus, in one embodiment, user-level anomaly prediction process 700 operates as a predictor of suspicious users that exhibit activity that is deviant from expected activity at the user level.

As performed at the first stage, after the user-level activities are initially learned, user-level activity prediction 710 performs an escort similarity analysis to (i) determine the number of dissimilar activities and (ii) where the number of dissimilar activities is less than the initial number of activities, repeat user-level activity prediction 710 (learning) with an increased value of the number of activities until the number of dissimilar activities is greater than or equal to the number T of top-weighted tuples (type-two vertices, also referred to as "actions") identified above.

The activity characterization system 100 has thus automatically determined a best-fit clustering of both group-level and user-level activities that most accurately represents dissimilar groups of users and inside-group activities on the basis of learned, observed user behavior. The group- and user-level activities represent conformant activity of users. Then, the activity characterization system 100 predicts activities of each individual user, producing activity probability vectors 735. Escort anomaly assessor 740 then matches the activity probability vectors 735 against group-level activities 430 and user-level activities 630 of the corresponding group to determine if the activity of a specific user is conformant with the group, or deviant. Where the group-level probabilities 425 and user-level probabilities 640 are respectively more similar to themselves than to the user-level activity probability vector 735 for a particular user account, the user account is behaving deviantly. Devant user accounts may warrant heightened scrutiny by downstream UEBA processes. Where the group-level probabilities 425 and user-level probabilities 640 are not more similar to themselves than to the user-level activity probability vector 735 for the user account, the user account is behaving in a manner conformant with the behavioral group.

As an example, where the account of a user assigned to a group gets compromised, and new activity associated with user's ID is being captured, the previously conformant user activity will become deviant, signaling a change or an anomaly in user activity. The illustrative example described with reference to FIGS. 9A and 9B below under the heading "Illustrative Example" shows such detection in additional detail.

—Escort Clustering—

In one embodiment, the dataset may be partitioned into clusters by a process referred to herein as escort clustering. In escort clustering, a pre-determined number of clusters need not be provided. Instead, an optimal number of clusters is inferred from the dataset itself. The optimal number of clusters is reached where the dataset is partitioned into clusters with maximally similar frequency vectors between the data points (i.e., the sparse frequency vectors) within each cluster, and maximally dissimilar frequency vectors between data points of different clusters. In the escort clustering process, similarity between data points is gauged or measured using Tri-Point Arbitration (TPA) similarity, discussed below.

In escort clustering, application of a recursive clustering algorithm (such as spectral clustering) to a sparse graph of K nearest neighbors of the data points is escorted or quasi-supervised with reference to a sparse graph of random neighbors of the data points. The term “quasi-supervised” is used herein to denote adaptation of an essentially unsupervised spectral clustering algorithm to introduce an aspect of supervision that determines when to halt the clustering from the data itself. In this way, the clustering algorithm is “escorted” by the data in the dataset to arrive at an optimal number of clusters.

Figure 8:
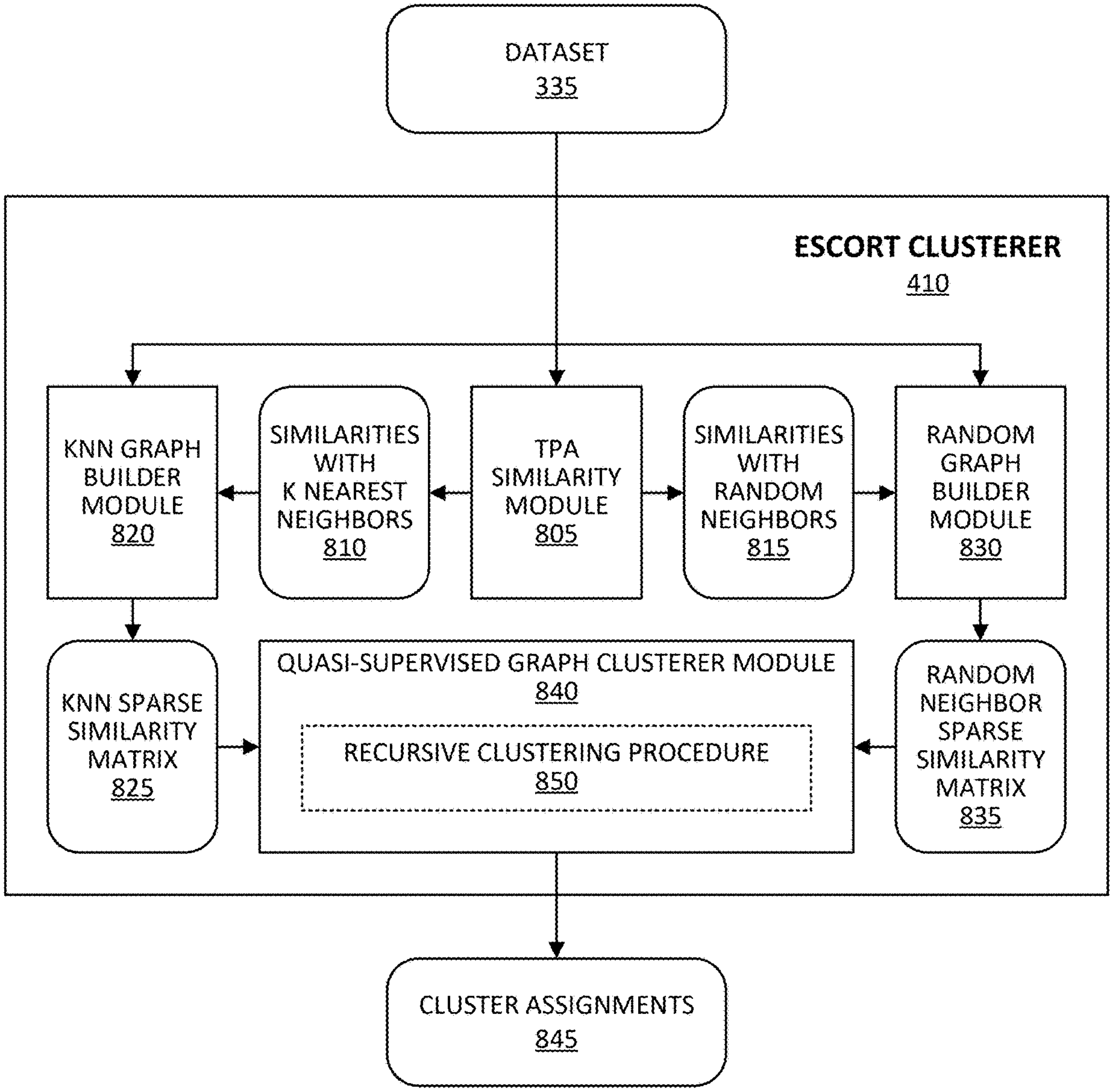
FIG. 8 illustrates one embodiment of an escort clusterer.

FIG. 8 illustrates one embodiment of escort clusterer 410. In one embodiment, escort clusterer 410 includes a TPA similarity module 805 that is configured to generate similarities (i.e., values of a similarity metric) between data points based on arbiter points representative of dataset 335. For example, TPA similarity module may be configured to generate similarities with K nearest neighbors 810 of a data point and similarities with random neighbors 815 with a data point. Escort clusterer 410 includes a K nearest neighbor graph builder (KNNGB) module 820 that is configured to generate a KNN sparse similarity matrix (KNNSSM) 825 of the dataset 335 using the similarities with k nearest neighbors 810 of each data point in the dataset 335. Escort clusterer 410 includes a random neighbor graph builder (RNGB) module 830 that is configured to generate a random neighbor sparse similarity matrix (RNSSM) 835 of the dataset 335 using the similarities with random neighbors 815 of each data point in the dataset 335. Escort clusterer 410 includes a quasi-supervised graph clusterer (QSGC) module 840 that is configured to partition the dataset 335 into optimally distinct clusters 845 based on the similarities stored in KNNSSM 825, with clustering halted at the optimal clusters based on the similarities stored in RNSSM 835. In one embodiment, escort clusterer 410 is configured to partition the dataset 335 using a recursive clustering procedure 850.

In one embodiment, TPA similarity module 805 is configured to generate similarity values between pairs of data points using a tri-point arbitration technique. TPA similarity module accepts as inputs one or more pairings of data points from dataset 335 (such as a data point and one or more neighboring data points) and dataset 335 (or a probability distribution of dataset 335), and returns measures of similarity between paired data points. Additional detail on the operation of TPA similarity module 805 is described below under the heading “TPA Similarity”.

In one embodiment, KNNGB module 820 is configured to construct KNNSSM 825, which is a sparse similarity matrix representation of the dataset. KNNSSM 825 records similarities between each data point of dataset 335 and the K other data points that are nearest—that is, most similar—to each data point. KNNSSM 825 may then be analyzed with graph clustering tools to determine clusters of users with similar behavior based on the tuples in the sparse vector data points representing the users.

As a practical matter, generating a fully-connected (or otherwise dense) similarity matrix for the dataset 335 of nodes (sparse vectors of tuples representing activity of users) is not possible for quantities of users commonly encountered in UEBA applications. Using fully-connected matrixes for clustering is intractable for datasets with as little as a few thousand nodes due to the excessive memory and computational resources required, while dataset 335 can typically have in excess of tens of thousands of nodes. Accordingly, KNNSSM 825 is a sparse matrix that records similarity values of a node with just K of the nearest neighbors of the node. The KNN sparse representation takes $O(mK)$ space, which is a significant saving over $O(m^2)$ for the dense case.

In one embodiment, the KNNGB module 820 employs Vantage Point trees (“VP trees”) for determining the K nearest neighbors (KNN) of each node. Use of VP trees allows the KNN search to be realized in sublinear time. In a VP tree, one node (sparse vector) of dataset 335 is chosen as the “vantage point” for each node in the tree. The remaining nodes are partitioned into two sets based on their distance to the vantage point. In one embodiment, the pair-wise distance between nodes is calculated. In one embodiment, the distance calculated is Jaccard distance, as discussed in greater detail below with reference to TPA similarity computations. In another embodiment, the distance is computed as a Euclidean distance or other suitable distance measure. The dataset 335 is split into a set of nodes that are closer to the vantage point (the closer subset) and another set of nodes that that are farther away from the vantage point (the farther subset). This partitioning is recursively applied to each subset, thereby generating a VP tree where each node stores a vantage point and a threshold radius that defines the boundary between the closer and farther subsets. Thus, in one embodiment, KNNGB module 820 is configured to build a VP tree for dataset 335.

From the VP tree for dataset 335, KNNGB module 820 is configured to construct KNNSSM 825 by searching the VP tree for K nearest neighbors of the nodes of dataset 335, and writing the node and its K nearest neighbors into a row of KNNSSM 825. In one embodiment, the value of K is relatively small, for example K may be 20 or fewer nearest neighbors.

Each node of dataset 335 is provided in turn as a query point for search to determine nearest neighbors. To find nearest neighbors to a query point based on the VP tree, the tree is traversed starting from the root of the VP tree. At each node encountered in the traversal of the tree, the distance is calculated from the query point to the vantage point for the node. The search is then continued in either the closer subset, the farther subset, or both, based on comparison of the calculated distance and the threshold radius of the node.

Where the distance is within the threshold radius, the closer subset (the subset of nodes that are closer to the vantage point) is searched. And, if the total distance of a minimum distance to a candidate nearest neighbor found thus far plus the distance from query point to vantage point is greater than or equal to the threshold radius, the farther subset (the subset of nodes that are farther from the vantage point) is also searched. Where this condition is true, the farther subset is searched in addition to the closer subset because it is possible under this condition that a nearer neighbor exists in the farther subset.

Where the distance is beyond the threshold radius, search the farther subset. And, if the total distance of the minimum distance to a candidate nearest neighbor found thus far minus the distance from query point to vantage point is less than or equal to the threshold radius, the closer subset is also searched. Where this condition is true, the closer subset is searched in addition to the farther subset because it is possible under this condition that a nearer neighbor exists in the closer subset.

In one embodiment, upon completion, KNNSSM 825 includes a row of similarities with nearest neighbors for each node (sparse vector representation of activities of an individual user) in dataset 335. For example, the structure of a row in the KNNSSM 825 for a node includes an identifier (such as a row index) for the node and up to K pairs of an identifier for a nearest neighbor node and an associated value of similarity of the node with the nearest neighbor node. In one embodiment, the value for similarity between a node and a neighbor node is a TPA similarity (discussed below). KNNGB module 820 is configured to output KNNSSM 825. For example, a KNNSSM for m nodes with K nearest neighbors may be formatted as follows:

```
KNNSSM=[
  [rowID11:value;rowID12:value;...;rowID1K:value],
  [rowID21:value;rowID22:value;...;rowID2K:value],
  ...
  [rowIDm1:value;rowIDm2:value;...;rowIDmK:value]
]
```

where rowIDij is the row index for the jth nearest neighbor of the ith row. Here, i runs from 1 to m and j from 1 to K. Each row—one for each node in dataset 335—represents up to K edge connections from one node to other, nearest neighbor nodes. The values are the similarity between the node and the neighbor, and may be considered a similarity weight of an edge between the nodes in KNNSSM 825.

In one embodiment, RNGB module 830 is configured to construct random neighbor sparse similarity matrix (RNSSM) 835, which is a second sparse similarity matrix representation of the dataset in addition to KNNSSM 825. RNSSM 835 records similarities between each data point of dataset 335 and other data points of dataset 335 that are chosen at random. RNSSM 835 may then be used as a quasi-supervisory reference that escorts the recursive clustering procedure 850 on KNNSSM 825 to an optimal clustering that is maximally similar within clusters, and maximally dissimilar across clusters.

The RNSSM 835 enables evaluation of the quality of clusters based on the dataset 335 while performing recursive clustering on KNNSSM 825. As mentioned above, there is no reliable way of deciding in advance on a number of clusters that fits the dataset 335 when clustering the dataset 335 using a sparse similarity matrix such as KNNSSM 825. In one embodiment, the RNSSM 835 is used to determine when to stop the cluster splitting procedure. As discussed below with reference to quasi-supervised graph clusterer module 840, further splitting is discontinued when the further splitting results in worsening or violating a cluster quality criterion that is based on the RNSSM 835.

In one embodiment, RNSSM 835 has a data structure similar to that of KNNSSM 825, having row entries representing similarity of a node with L neighbors. However, instead of populating the entries with nearest neighbors for each node, the entries of the RNSSM 835 are populated using randomly selected neighbors. In one embodiment, the rows for the nodes may be numbered or otherwise indexed alike in both the KNNSSM 825 and the RNSSM 835 for ease of cross-referencing. As for the KNNSSM 825 above, the L similarity values recorded for each node in the RNSSM 835 are determined by TPA similarity. In one embodiment, the nodes of RNSSM 835 are assigned a same number L of random neighbors as the number K of nearest neighbors assigned to the nodes of KNNSSM 825, although in other embodiment, L need not be equal to K. Both L and K may be configurable parameters that may be pre-specified by administrators of the activity characterization system 100.

RNGB module 830 is configured to output RNSSM 835. For example, a RNSSM for m nodes with L random neighbors may be formatted as follows:

```
RNSSM=[
  [rowID11:value;rowID12:value;...;rowID1L:value],
  [rowID21:value;rowID22:value;...;rowID2L:value],
  ...
  [rowIDm1:value;rowIDm2:value;...;rowIDmL:value]
]
```

where rowIDij is the row index for the jth randomly selected neighbor of the ith row. Here, i runs from 1 to m and j from 1 to L. Each row—one for each node in dataset 335—represents up to L edge connections from one node to other, random neighbor nodes. The values are the similarity between the node and the neighbor, and may be considered a similarity weight of an edge between the nodes in RNSSM 835. The combined KNNSSM and RNSSM representations take $O(m\times(K+L))$ space, which remains significant saving over $O(m^2)$ for dense representation of the similarity.

In one embodiment, QSGC module 840 is configured to perform escort clustering of the input KNNSSM 825 using the corresponding RNSSM 835 to supply the stopping criteria for a recursive spectral clustering procedure. In one embodiment, QSGC module 840 employs recursive spectral clustering to iteratively split the dataset 335 into optimally distinct clusters without pre-specifying a final number of clusters. In one embodiment, QSGC module 840 iteratively subdivides data clusters based on TPA similarity in the KNNSSM 825 until no further meaningful separations are found to be possible based on cross-cluster TPA similarity in the RNSSM 835.

In general, spectral clustering (also referred to as spectral partitioning) is one unsupervised approach for clustering graphs that has a need for specifying an appropriate number of clusters in advance, making ordinary spectral clustering inapplicable to activity characterization cases where the true subdivisions of behavior are unknown in advance because they are hidden in the data. In one embodiment, QSGC module 840 implements a uniquely improved form of spectral clustering—referred to herein as "Escort Clustering"—that allows the recursive clustering procedure to automatically stop once it has arrived at a set of clusters for which no further subdivisions would be dissimilar in the context of the dataset, without pre-specifying any particular number of clusters. The resulting set of clusters may also be referred to as "optimal". Moreover, QSGC module 120 achieves the optimal clustering using sparse similarity representations of the dataset, without relying on a dense similarity representation of the dataset.

In one embodiment, QSGC module 840 executes a recursive clustering procedure 850. Initially, all nodes in the dataset 835 are placed into a single initial cluster. At a high level, recursive clustering procedure 850 applies a spectral partitioner on the portion of the KNNSSM 825 that corresponds to the cluster to split the cluster optimally. In one embodiment, to split a given cluster into subclusters, recursive clustering procedure 850 finds a subset of a cluster with a minimum number of edges that can be cut to separate it from the remainder of the cluster. This may be referred to as the minimum cut. Recursive clustering procedure 850 severs the edges of the minimum cut to separate the cluster into two (or more) subclusters. The same clustering step is then applied, e.g. recursively, to each resulting subcluster, again splitting individual subclusters into two or more subclusters until a stop condition is reached for further splits.

In one embodiment, where recursive clustering procedure 850 splits a cluster into two subclusters, the split is based on arithmetic signs (i.e., positive or negative) of elements of the Fiedler vector of a graph Laplacian (GL) computed from the portion of the KNNSSM 825 that corresponds to the cluster. The Fiedler vector is a particular Eigenvector that corresponds to the smallest non-zero Eigenvalue of a graph Laplacian GL.

In one embodiment, where recursive clustering procedure 850 splits a cluster into more than two subclusters, the split is based on k-means clustering using a group of Eigenvectors corresponding to smallest non-zero Eigenvalues of the graph Laplacian GL computed from the portion of the KNNSSM 825 that corresponds to the cluster.

In one embodiment, the GL is given by EQ. 4 below:

$$GL = D - KNNSSM \quad \text{EQ. 4}$$

where D is the degree matrix—a diagonal matrix with diagonal elements equal to the sum of row values of the KNNSSM 825. In other words, where KNNSSM 825 has m rows, the degree matrix D is a m×m matrix where each diagonal element $D_{ii}$, i=j is the sum of the similarities in row i in the KNNSSM, and the off-diagonal elements $D_{ii}$, i≠j are zero. The graph Laplacian GL describes the difference between the degree matrix and the KNNSSM 825. The graph Laplacian GL encodes the contextual relationships between neighboring nodes of a cluster of nodes from dataset 335. The diagonal entries $GL_{ii}$, i=j include the cumulative similarity of node i with its nearest neighbors, while the off-diagonal entries $GL_{ij}$, i≠j is the negative of the similarity value between nodes i and j.

From the graph Laplacian GL, recursive clustering procedure 850 computes Eigenvalues and their corresponding Eigenvectors. In one embodiment, recursive clustering procedure 850 executes a block Chebyshev-Davidson method-based solver (BCDM solver) for finding Eigenvectors with smallest non-zero Eigenvalues of a graph Laplacian. Other solvers may also be used to find the set of Eigenvectors with smallest non-zero Eigenvalues of a graph Laplacian.

Once the Eigenvectors and Eigenvalues are available, in one embodiment, recursive clustering procedure 850 selects the Fiedler vector as a basis for partitioning the cluster. The element values of the Fiedler vector guide the partitioning decision to minimize connectivity between clusters while maximizing connectivity within clusters. For example, the sign (i.e., positive or negative) of the elements determine the partition of the cluster. Where the elements of the Fiedler vector alternate in sign, recursive clustering procedure 850 makes a cut between nodes with positive values for an element and nodes with negative values for the element to partition the cluster into two subclusters.

Or, once the Eigenvectors and Eigenvalues are available, in one embodiment, recursive clustering procedure 850 selects a subset of Eigenvectors corresponding to the smallest non-zero Eigenvalues as the basis for partitioning the cluster. In one embodiment, the Eigenvectors selected are those corresponding to the Eigenvalues that precede a sharp change in rate of increase of the Eigenvalues in ascending order. Each node of the cluster is represented as a vector in a low-dimensional Eigenspace spanned by these Eigenvectors. Recursive clustering procedure 850 applies the k-means clustering algorithm to the vector representations of the nodes in the low-dimensional Eigenspace to obtain centroids. Recursive clustering procedure 850 assigns each node of the cluster to a subcluster associated with a centroid that is nearest to the vector representation of the node in the low-dimensional Eigenspace. The recursive clustering procedure 850 makes cuts between the assigned subclusters of nodes.

Regardless of splitting technique, in one embodiment, recursive clustering procedure 850 evaluates each split of a cluster to determine whether the resulting subclusters are truly dissimilar in the context of the dataset 335. After each split, recursive clustering procedure 850 evaluates the subclusters resulting from the split using a stopping criterion. The stopping criterion checks the validity and quality of the subclusters based the RNSSM 835. In one embodiment, recursive clustering procedure 850 identifies the nodes that belong to the subclusters in the RNSSM 835; determines a cross-cluster similarity of the nodes based on the similarities of the nodes with random neighbors recorded in the RNSSM 835; and determines whether the cross-cluster similarity is positive, indicating that the partition into the subclusters should be rejected and recursive clustering stopped, or negative, indicating that the partition into the subclusters should be accepted and recursive clustering continued for the subclusters. This enables the stopping criterion to evaluate the validity and quality of clusters based on cross-cluster similarities computed on the RNSSM 835, using cluster assignments generated by clustering of the KNNSSM 825.

In one embodiment, to identify the nodes that belong to the subclusters in the RNSSM 835, recursive clustering procedure 850 extracts the node identifiers of the nodes belonging to the subclusters from the KNNSSM 825 and a cluster identifier for the cluster to which the node is assigned. Then, recursive clustering procedure 850 locates the corresponding nodes (e.g., nodes having the same node identifiers) of the subclusters in the RNSSM 835, and associates the nodes in the RNSSM 835 with the cluster identifiers assigned to the corresponding nodes in the KNNSSM 825. In this way, subclusters that are created with reference to the KNNSSM 825 (based on similarities recorded in the KNNSSM 825) are also created with reference to the RNSSM 835.

Then, recursive clustering procedure 850 determines cross-cluster similarity between the subclusters in the RNSSM 835 based on the similarities of the nodes with random neighbors that are recorded in the RNSSM 835. Cross-cluster similarity may be computed using insider-based TPA similarity values ranging between −1.0 and 1.0 (discussed below), such that negative values for cross-cluster similarity represent dissimilar clusters and positive values for cross-cluster similarity represent similar clusters. In one embodiment, the cross-cluster similarity is a sum of similarities with random neighbors for nodes from the assigned subclusters. In one embodiment, recursive clustering procedure 850 sums similarity entries in the RNSSM 835 corresponding to pairs of nodes from different subclusters. In particular, all pairings of nodes (u,v) from different subclusters ($C_i$, $C_j$) are iterated through, and the TPA similarity values of the respective random neighbors in the paired records are summed. This produces a cumulative sum of similarities of the random neighbors for all the pairs of records. This cross-cluster similarity (CCSIM) is given by EQ. 5 below:

$$CCSIM\,(C_i, C_j) = \sum RNSSM_{uv},\ \text{for}\ \forall\, u \in C_i\ \text{and}\ v \in C_j \qquad \text{EQ. 5}$$

At the end of the summing, the arithmetic sign (i.e., positive or negative) of the cross-cluster similarity in the RNSSM 835 is determinative as to whether the subclusters are similar or not. In one embodiment, recursive clustering procedure 850 determines whether to stop or continue the recursive clustering process based on whether or not a stopping criterion (SC) is satisfied. The stopping criterion SC remains unsatisfied while all cross-cluster similarities CCSIM for all pairs of clusters are negative. The stopping criterion SC is satisfied once one or more cross-cluster similarities CCSIM for all pairs of clusters are positive. Given two or more subclusters $\{C_1, C_2, \ldots\}$, the stopping criterion (SC) is given by EQ. 6 below:

$$SC = CCSIM\,(C_i, C_j) \geq 0\ \text{for}\ \forall\, i, j\ \text{and}\ i \neq j \qquad \text{EQ. 6}$$

In one embodiment, where newly created subclusters fail to satisfy the stopping criterion (SC:FALSE), further splits may be available to maximize inter-cluster dissimilarity and intra-cluster similarity. Failure to satisfy the stopping condition SC indicates that the subclusters are valid clusters. Assignments of the nodes to the subclusters are recorded, for example by labeling the nodes assigned to a subcluster with a cluster identifier for the subcluster. The recursive clustering procedure 850 is therefore executed on each of the subclusters.

And, in one embodiment, where newly created subclusters satisfy the stopping criterion (SC:TRUE) no further splits should be made. The split that would result in subclusters being similar across clusters (positive cross-cluster similarity) rather than dissimilar (negative cross-cluster similarity) is discarded, and the unsplit cluster is retained as the final cluster. The prior cluster assignments of the nodes are retained, for example by leaving prior labels of cluster identifiers unmodified.

In one embodiment, the stopping criterion SC may also serve as a metric for cluster quality. Given two alternative valid clusterings, the one with a smaller sum of cross-cluster similarities is considered "better" and chosen preferentially over the other. Thus, in one embodiment, recursive clustering procedure 850 may prefer clusterings with smaller cross-cluster similarities.

When cross-cluster similarity between all further subclusters becomes positive, no further clusters that are dissimilar can be obtained, an optimal number of clusters has been reached, and further subdivision should cease. In one embodiment, once the stopping condition SC has been satisfied for all subclusters of the data points, the recursive clustering procedure 850 completes. The nodes of dataset 335 have been split into a set of clusters that correspond with observable behavior groups of user activity. The set of clusters generated is a maximum number of clusters that are dissimilar, based on TPA similarity analysis. The resulting clusters are all mutually dissimilar, and correspond to behavior groups that are observably dissimilar from each other.

The QSGC module 840 outputs the set of clusters, each cluster representing a group of users that have similar activity profiles. For example, QSGC module 840 outputs the cluster identification labels associated with each node of dataset 335. As each node of dataset 335 represents an activity profile for a discrete user, the cluster assignments represent behavioral groups of users that share similar activities.

—TPA Similarity—

In one embodiment, activity characterization system 310 determines similarity between data points by a technique referred to herein as tri-point arbitration (TPA). Similarity determined by TPA (also referred to herein as "TPA Similarity") provides an insider-based computation of similarity that, rather than determining similarity based on a determination by an external analyst, instead determines similarity with reference to an internal arbiter that is representative of the dataset. By introducing the internal arbiter, the dataset itself—e.g., the collective sparse frequency vectors—provides the context to decide what activities are similar or dissimilar to each other. In one embodiment, TPA similarity module 805 operates to determine TPA similarity between data points as follows.

Rather than expressing similarity by comparing distances between two data points in the dataset to a range of similarity defined by external analysis, TPA uses three points to determine similarity. TPA employs the two data points in the dataset that are being compared along with a third, internal arbiter point that represents the data set. Involving the arbiter point introduces representation of intrinsic structure of the dataset into the similarity calculation. Therefore, when evaluating TPA similarity between two data points of the dataset, the activity characterization system 100 also selects an arbiter point ($a_1$) from a set of arbiter points A that is representative of the dataset. The TPA similarity between the two nodes is then calculated based, at least in part, on a distance between the first and second data points and the selected arbiter point $a_1$.

A TPA similarity S for data points ($r_i$, $r_j$) with respect to arbiter point $a_1$ is calculated as shown in EQ. 7 below, where ρ designates a two-point distance determined according to a given distance function:

$$S(r_i, r_j|a_1) = \frac{\min\{\rho(r_i, a_1), \rho(r_j, a_1)\} - \rho(r_i, r_j)}{\max\{\rho(r_i, r_j), \min\{\rho(r_i, a_1), \rho(r_j, a_1)\}\}} \qquad \text{EQ. 7}$$

Thus, in one embodiment, TPA similarity S is generated based on a first distance between the first and second data points $\rho(r_i, r_j)$, a second distance between the first data point and the arbiter point $\rho(r_i, a_1)$, and a third distance between the second data point and the arbiter point $\rho(r_j, a_1)$.

In one embodiment, the distance function ρ is a Jaccard distance $\rho_J$ between two data points x and y, given by EQ. 8 below, where X is a number (that is, a count or tally) of attributes present in data point x, where Y is a number of attributes present in data point y, and Z is the number of attributes present in both data points x and y:

$$\rho_J(x, y) = 1 - \left(\frac{Z}{X + Y - Z}\right) = 1 - \frac{|X \cap Y|}{|X \cup Y|} \qquad \text{EQ. 8}$$

The number Z may also be described as the size of the intersection of the sets of attributes of data points x and y, and the number X+Y−Z may also be described as the size of the union of the sets of attributes of data points x and y. (Note, Jaccard distance $\rho_J$ is the complement of the Jaccard index J.) In one embodiment, the distance function ρ may be another distance function, such as Euclidean distance, Manhattan distance, or cosine distance.

The TPA similarity of EQ. 4 is a per-arbiter TPA similarity that is specific to an individual arbiter point $a_1$. Per-arbiter TPA similarity for a given pair of data points ($r_i$, $r_j$) may be aggregated over a set of arbiter points A that includes a plurality of arbiter points ($a_1$-$a_m$). In one embodiment, aggregation over multiple arbiter points represents the intrinsic structure of the dataset more fully and accurately in the similarity analysis. Thus, the activity characterization system 100 may calculate additional per-arbiter TPA similarities using the remaining respective arbiter points in the set of arbiter points A and combine the per-arbiter TPA similarities to produce a multi-arbiter TPA similarity. The aggregate, multi-arbiter TPA similarity for a given pair of data points ($r_i$, $r_j$) is calculated as shown by EQ. 9 below:

$$S(r_i, r_j|A) = \frac{1}{m}\sum_{k=1}^{m} S(r_i, r_j|a_k) \quad \text{EQ. 9}$$

EQ. 3 aggregates per-arbiter TPA similarities by determining a mean of the per-arbiter TPA similarities. Other examples of aggregating the per-arbiter TPA similarities may also include determining: (i) a weighted mean of the per-arbiter TPA similarities based on a given criteria for relative importance of the respective arbiters; (ii) a median of the per-arbiter TPA similarities; (iii) a mode (value that occurs most frequently) for the per-arbiter TPA similarities; (iv) a geometric mean of the per-arbiter TPA similarities (that is, $m^{th}$ root of the product of the m per-arbiter TPA similarities); and so on.

As mentioned above, the arbiter points represent the dataset rather than an arbitrary determination by an external analyst. The set of arbiter points A may be selected to represent an inherent structure—in particular, the probability distribution—of the dataset. In one embodiment, the set of arbiter points A may be selected based on an empirical observation of the dataset, for example by sampling the arbiter points from the data points in the dataset. For example, a random sampling of the data points in the dataset will yield a set of arbiter points A with a probability distribution consistent with that of the dataset. Or, in another example, a selection of all the data points in the dataset will yield a set of arbiter points A with a probability distribution consistent with that of the dataset. In one embodiment, arbiter points may be generated based on an actual or an estimated probability distribution of the data points in the dataset.

Values for TPA similarity range from −1 to 1. TPA similarity is greater than zero when both distances from the arbiter to either data point are greater than the distance between the pair of data points. In this situation, the data points are closer to each other than to the arbiter. Therefore, a positive TPA similarity indicates that the data points are similar. The magnitude of the positive TPA similarity indicates an extent to which the data points are similar. A TPA similarity equal to positive one indicates a highest level of similarity, in which the data points are coincident with (that is, overlap or occupy a same position in the vector space) as each other.

TPA similarity is less than zero when the distance between the arbiter and one of the data points is less than the distance between the between the pair of data points. In this situation, the arbiter is closer to one of the between the pair of data points than the between the pair of data points are to each other. Therefore, a negative TPA similarity indicates that the that the data points are dissimilar. The magnitude of the negative TPA similarity indicates an extent of dissimilarity between the data points. A TPA similarity equal to negative one indicates a complete dissimilarity between the data points (and, incidentally, that the arbiter point coincides with one of the data points).

TPA similarity equal to zero results when the arbiter and data points are equidistant from one another. In this situation, there is complete neutrality with respect to the arbiter point. Therefore, a TPA similarity of zero indicates that the that the data points are neither similar nor dissimilar.

In one embodiment, activity characterization system 100 determines TPA similarity of a first data point and a second data point by: accessing the first data point and the second data point from a dataset; choosing an arbiter point that is representative of a structure of the dataset; determining a first Jaccard distance between the first data point and the arbiter point; determining a second Jaccard distance between the second data point and the arbiter point, and determining a third Jaccard distance between the first data point and the second data point; determining which of the first Jaccard distance and the second Jaccard distance is smaller; subtracting the third Jaccard distance from the determined smaller Jaccard distance, and setting the difference as a dividend; determining which of the third Jaccard distance and the determined smaller Jaccard distance is larger, and setting the determined larger Jaccard distance as a divisor and finding the quotient of the dividend and divisor as the TPA similarity.

In one embodiment, activity characterization system 100 determines TPA similarity of a first data point and a second data point by repeating the foregoing process for a plurality of distinct arbiter points that are representative of the structure of the dataset, and aggregating the per-arbiter TPA similarities.

ILLUSTRATIVE EXAMPLE

Figure 9A:
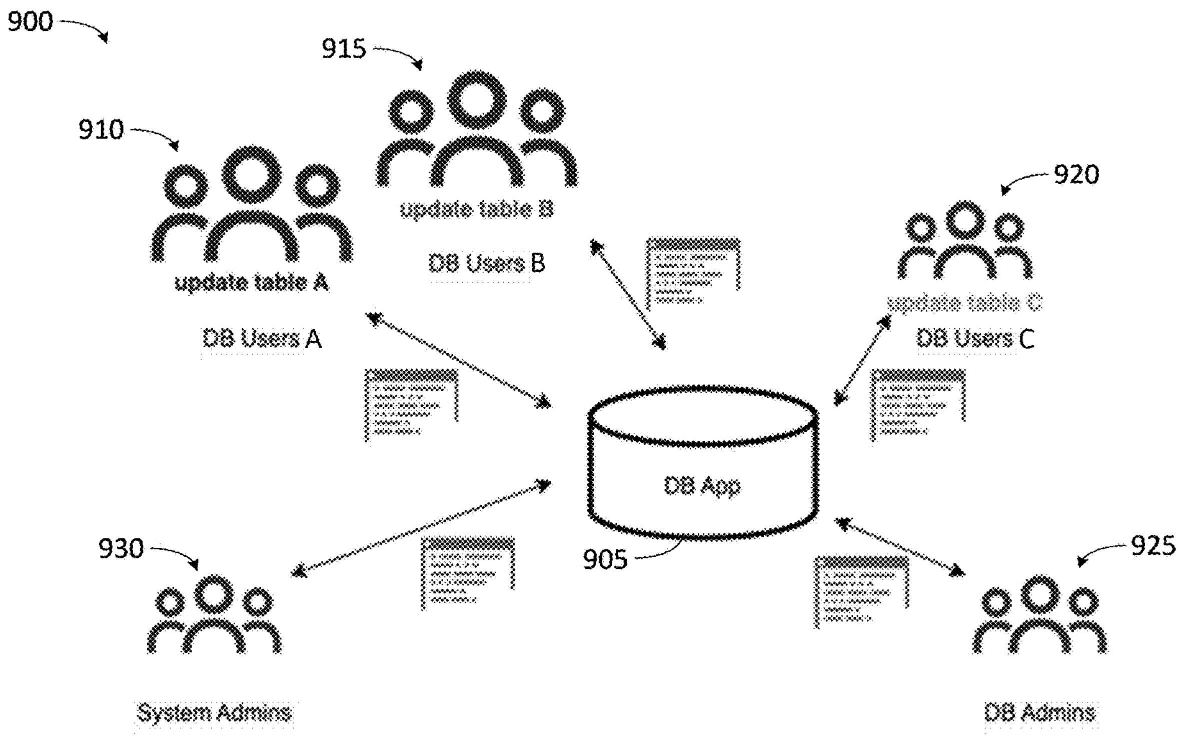
FIG. 9A shows an example environment for the illustrative example in which no malicious activity is occurring.

An illustrative example is provided to show, in one embodiment, how activity characterization system 100 may model activity for detecting deviant user activity that might be associated with data leak or similar malicious and/or uncompliant behavior. FIG. 9A shows an example environment 900 for the illustrative example in which no malicious activity is occurring.

Assume there is a database application 905 with tables of customer information. There are 3 groups of regular database users—DB Users A 910, DB Users B 915, and DB Users C 920—who work with the tables. An audit system logs all user actions and the activity characterization system 100 receives log messages 305 that contain username and attribute-value pairs. Each user group DB Users A 910, DB Users B 915, and DB Users C 920 predominantly perform, respectively, "update table A" or "update table B" or "update table C" operations. And, each of DB Users A 910, DB Users B 915, and DB Users C 920 may occasionally perform other actions like insert, select and updates to the other tables. Therefore, the expected, baseline activity of user from a behavioral group associated with updating table A will be "update table A", the expected, baseline activity of user from a behavioral group associated with updating table B will be "update table B", and the expected, baseline activity of user from a behavioral group associated with updating table C will be "update table C".

In the illustrative example, the dataset 335 includes 30 of the regular database users 910, 915, 920; 2 database administrators 925; and 2 system administrators 930.

numDbUsers: 30
num DbAdmins: 2
numCloudAdmins: 2

The database administrators 925 and system administrators 930 have dominant activities that are different from the activities of the regular users 910, 915, 920. So, when performing the activity characterization process described herein, at least 5 behavioral groups of users are expected to be learned from the log messages 305.

In the illustrative example, the regular users have the following usernames:

dbusernames=[dbuser1, dbuser2, dbuser3, dbuser4, dbuser5, dbuser6, dbuser7, dbuser8, dbuser9, dbuser10, dbuser11, dbuser12, dbuser13, dbuser14, dbuser15, dbuser16, dbuser17, dbuser18, dbuser19, dbuser20, dbuser21, dbuser22, dbuser23, dbuser24, dbuser25, dbuser26, dbuser27, dbuser28, dbuser29, dbuser30]

In the illustrative example, the database administrators have the following usernames:

$$dbadmins = [dbadmin1, dbadmin2]$$

And, in the illustrative example, the system administrators have the following usernames:

$$admins = [admin1, admin2]$$

Activity of each user can be summarized using bags of tuples of attribute values with count, such as bags 315, 320, and 325 as discussed above with reference to FIG. 3. For example, the bag of one of the regular users is shown here:

dbuser9
<select | table b> : 1
<update | table a> : 50
<update | table c> : 1
<update | table b> : 1
<select | table a> : 1

Note that the dominant activity of user dbuser9 is to update table A. User dbuser9 is thus a member of DB Users A 910.

An example bag of another one of the regular users is shown here:

dbuser20
<select | table c> : 2
<insert | table a> : 1
<update | table c> : 51
<insert | table c> : 2
<update | table b> : 1
<select | table a> : 2

The dominant activity of user dbuser20 is to update table C. User dbuser20 is thus a member of DB Users C 920.

Note dbuser1. The account of this user will be used to data leak later on in the illustrative example. The normal activity of dbuser1 is described by the following bag:

dbuser1
<select | table b> : 2
<insert | table a> : 2

-continued

<update | table a> : 1
<update | table c> : 50
<insert | table c> : 2
<update | table b> : 1
<insert | table b> : 1

The dominant activity of dbuser1 is to update table C. User dbuser1 is thus another member of DB Users C 920. So, it is expected that the activity characterization process described herein places dbuser1 into the same behavioral group as dbuser20 when everything is normal.

An example bag of activities of a database administrator 925 is shown in the following bag:

dbadmin1
<update | dbuser> : 50
<create | dbuser> : 50
<create | report> : 51
<select | table c> : 1
<update | table a> : 1
<create | table> : 50
<update | table> : 50
<update | table b> : 1

Note that the bag differs significantly from the bags of regular users 910, 915, 920.

Further, a bag of activities of a system administrator 930 is different from the bags of regular users 910, 915, 920 and from the bags of database administrators 925, as shown in the following example bag:

admin1
<create | report> : 1
<select | table b> : 1
<delete | compartment> : 50
<update | policy> : 51
<create | network> : 50
<update | table a> : 1
<create | db> : 1
<update | table c> : 1
<update | table b> : 1
<select | table a> : 1

Applying activity characterization analysis as shown and described herein produces the following results:

numClusters: 5
Behavioral Cluster Assignments:

| | |
|---|---|
| **dbuser9** | **3** |
| dbuser24 | 3 |
| dbuser23 | 3 |
| dbuser22 | 3 |
| dbuser21 | 3 |
| dbuser28 | 3 |
| dbuser29 | 3 |
| dbuser4 | 3 |
| dbuser6 | 3 |
| dbuser13 | 3 |
| dbuser12 | 3 |
| dbuser16 | 3 |
| dbuser19 | 3 |
| dbuser18 | 3 |
| **dbuser20** | **0** |
| dbuser26 | 0 |
| **dbuser1** | **0** |
| dbuser5 | 0 |

-continued numClusters: 5
Behavioral Cluster Assignments:

| | |
|---|---|
| dbuser8 | 0 |
| dbuser30 | 0 |
| dbuser11 | 0 |
| dbuser15 | 0 |
| dbadmin1 | 2 |
| dbadmin2 | 2 |
| dbuser2 | 4 |
| dbuser3 | 4 |
| dbuser7 | 4 |
| dbuser27 | 4 |
| dbuser25 | 4 |
| dbuser10 | 4 |
| dbuser17 | 4 |
| dbuser14 | 4 |
| admin1 | 1 |
| admin2 | 1 |

As expected the system automatically identified the correct number of behavioral groups putting all users with similar activity in the same cluster and users with different activities into different clusters based on the UBA features captures in the tuple bags.

For example, all users with dominant activity of updating table C, including dbuser1 and dbuser20, were put into the same cluster with cluster ID number '0'.

The system further identified 5 distinct group-level activities described as probability distributions over tuples. Activities are represented as sparse vectors with position-value pairs.

A0:{ <update|table a>:0.90, <update|table b>:0.01, < select|table b >:0.01,...}
A1:{< delete|compartment >:0.18,< update|policy >:0.18, < create|network >:0.18,...}
A2:{< create|dbuser >:0.23,< update|dbuser >:0.22, < create|table >:0.11,...}
A3:{< update|table c >:0.83, < select|table c >:0.02, < insert|table c >:0.02,...}
A4:{< update|table b >:0.77, < insert|table a >:0.02, < insert|table b >:0.02,...}

Note there are one dominant activity for each behavioral group representing the probability of a specific action in that group. And the activities of administrators reflect their dominant activities. The activity modeling guided by the behavioral groups correctly identified the dominant activities.

And the dominant activities for each group are very apparent from the predicted probabilities for the groups:

BG1:{A0:2.4E−4, A1:0.99, A2:1.8E−4, A3:1.8E−4, A4:1.6E−4}
BG2:{A0:2.8E−4, A1:2.3E−4, A2:2.1E−4, A3:2.1E−4, A4:0.99}
BG3:{A0:0.99, A1:1.3E−4, A2:1.2E−4, A3:1.2E−4, A4:1.1E−4}
BG4:{A0:3.0E−4, A1:2.5E−4, A2:0.99, A3:2.3E−4, A4:2.1E−4}
BG5:{A0:2.7E−4, A1:2.3E−4, A2:2.0E−4, A3:0.99, A4:1.9E−4]

The self-reliant activity modeling accurately identified the existing activities.

Figure 9B:
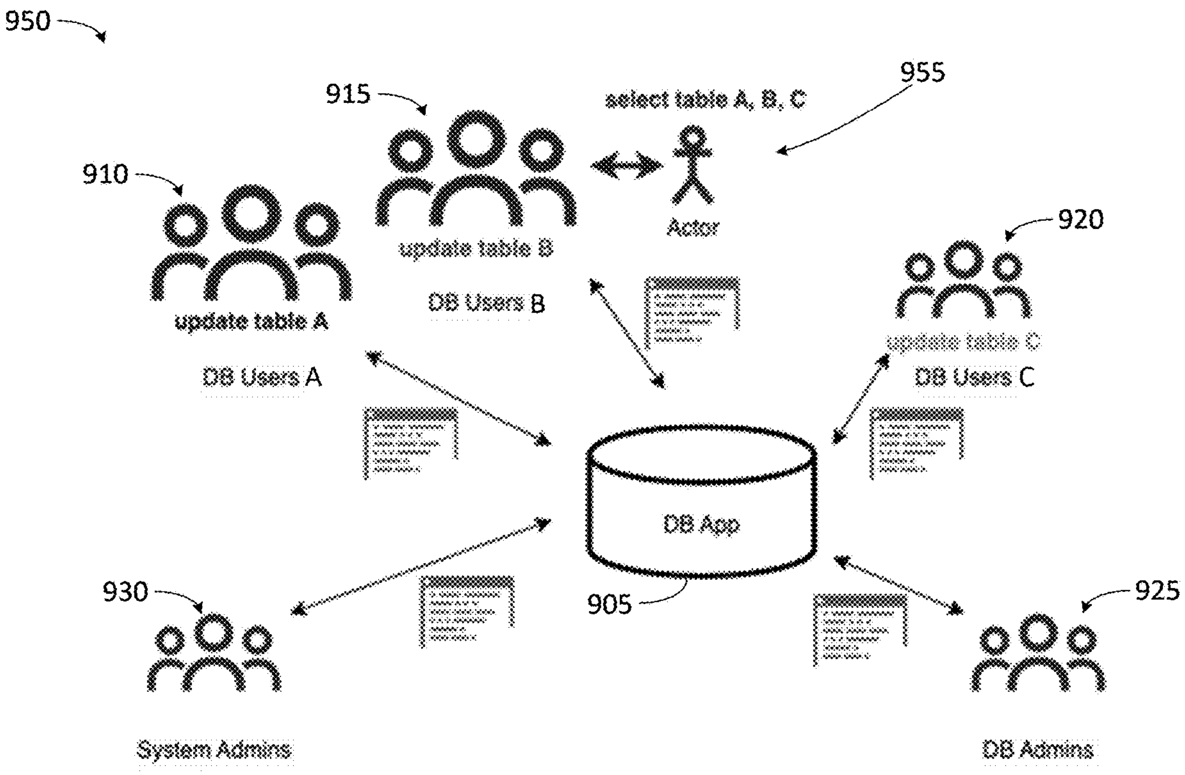
FIG. 9B shows an example environment for the illustrative example in which malicious activity is occurring.

Referring now to FIG. 9B, FIG. 9B shows an example environment 950 for the illustrative example in which malicious activity is occurring. Assume, for example, that the account of dbuser1 has been compromised, and a malicious actor 955 has started copying data by running a lot of select statements on database application 905.

The compromised dbuser1 activity bag may now look like this:

dbuser1
<select | table b> : 53
<insert | table a> : 1
<update | table a> : 1
<update | table c> : 1
<insert | table c> : 1
<update | table b> : 1
<insert | table b> : 1

Running the activity characterization analysis again, the activity characterization system automatically identifies 6 behavioral clusters, instead of the previous 5. The activity characterization system has placed the anomalous user dbuser1 into a separate cluster. Placement of a user into a separate cluster is a signal for a significant behavior change of the user.

numClusters: 6

Also, a new activity associated with the new behavior of the user dbuser1 was identified:

A0:{< update|table a >:0.90, < update|table b >:0.01, < select|table b >:0.01,...}
A1:{< delete|compartment >:0.18,< update|policy >:0.18, < create|network >:0.18,...}
A2:{< create|dbuser >:0.23,< update|dbuser >:0.23,< create|report >:0.11,...}
A3:{< update|table c >:0.83, < select|table c >:0.02, < insert|table c >:0.01,...}
A4:{< update|table b >:0.79, < insert|table a >:0.02, < insert|table b >:0.02,...}
A5:{< select|table b >:0.64, < create|network >:0.03, < delete|compartment >:0.03,...}

The system identified user dbuser1 as deviant as expected and consistent with the data model of the example.

—Cloud or Enterprise Embodiments—

In one embodiment, the present system (such as activity characterization activity characterization system 100) is a computing/data processing system including a computing application or collection of distributed computing applications for access and use by other client computing devices that communicate with the present system over a network. In one embodiment, activity characterization system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, activity characterization system 100 is a centralized server-side application that provides at least the functions disclosed herein and that is accessed by many users by way of computing devices/terminals communicating with the computers of activity characterization system 100 (functioning as one or more servers) over a computer network. In one embodiment activity characterization system 100 may be implemented by a server or other computing device configured with hardware and software to implement the functions and features described herein.

In one embodiment, the components of activity characterization system 100 may be implemented as sets of one or more software modules executed by one or more computing devices specially configured for such execution. In one embodiment, the components of activity characterization system 100 are implemented on one or more hardware computing devices or hosts interconnected by a data network. For example, the components of activity characterization system 100 may be executed by network-connected computing devices of one or more computing hardware shapes, such as central processing unit (CPU) or general-purpose shapes, dense input/output (I/O) shapes, graphics processing unit (GPU) shapes, and high-performance computing (HPC) shapes.

In one embodiment, the components of activity characterization system 100 intercommunicate by electronic messages or signals. These electronic messages or signals may be configured as calls to functions or procedures that access the features or data of the component, such as for example application programming interface (API) calls. Other electronic messages, such as log messages, may be delivered through message queues or event streams for transferring messages from a component that is publishing the log messages to one or more components that are subscribed to the queue or stream. Further, electronic messages may include direct database queries and responses to various SQL and NoSQL databases, such as graph databases.

In one embodiment, these electronic messages or signals are sent between hosts in a format compatible with transmission control protocol/internet protocol (TCP/IP) or other computer networking protocol. Components of activity characterization system 100 may (i) generate or compose an electronic message or signal to issue a command or request to another component, (ii) transmit the message or signal to other components of activity characterization system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by activity characterization system 100, for example through a web interface server. In one embodiment, the remote computing system may send requests to and receive responses from activity characterization system 100. In one example, access to the information or applications may be effected through use of a web browser on a personal computer or mobile device. In one example, communications exchanged with activity characterization system 100 may take the form of remote representational state transfer (REST) requests using JavaScript object notation (JSON) as the data interchange format for example, or simple object access protocol (SOAP) requests to and from XML servers. The REST or SOAP requests may include API calls to components of activity characterization system 100.

—Software Module Embodiments—

In general, software instructions are designed to be executed by one or more suitably programmed processors accessing memory. Software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Computing Device Embodiment—

Figure 10:
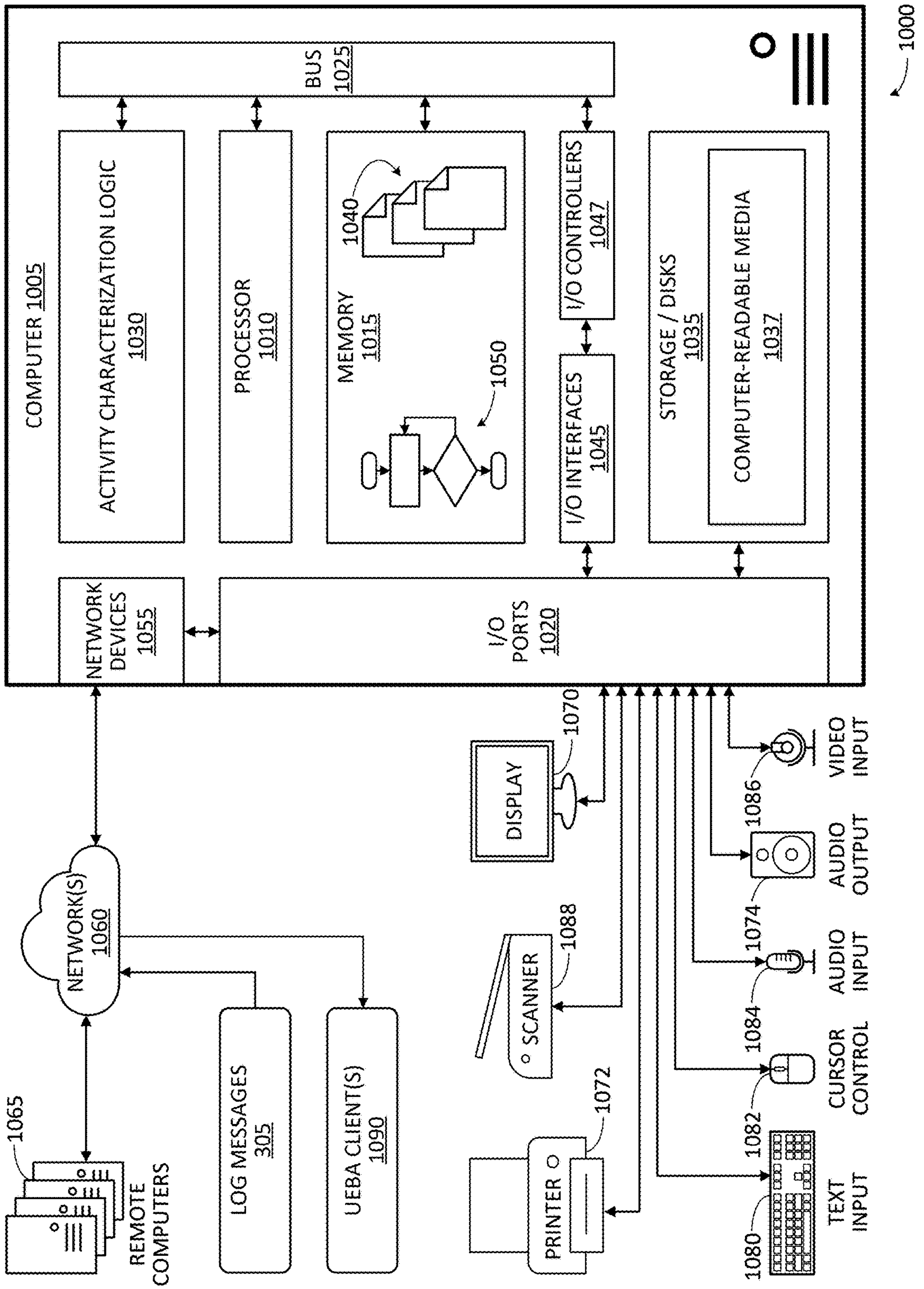
FIG. 10 illustrates an embodiment of a computing system configured with the example systems and/or methods disclosed.

FIG. 10 illustrates an example computing system 1000 that is configured and/or programmed as a special purpose computing device(s) with one or more of the example systems and methods described herein, and/or equivalents. The example computing device may be a computer 1005 that includes at least one hardware processor 1010, a memory 1015, and input/output ports 1020 operably connected by a bus 1025. In one example, the computer 1005 may include activity characterization logic 1030 configured to facilitate self-reliant characterization of activities of users in cloud applications and services, similar to the logic, system, and methods shown in and described with reference to FIGS. 1-9B.

In different examples, the logic 1030 may be implemented in hardware, one or more non-transitory computer-readable media 1037 with stored instructions, firmware, and/or combinations thereof. While the logic 1030 is illustrated as a hardware component attached to the bus 1025, it is to be appreciated that in other embodiments, the logic 1030 could be implemented in the processor 1010, stored in memory 1015, or stored in disk 1035.

In one embodiment, logic 1030 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application-specific integrated circuit (ASIC) programmed to facilitate self-reliant characterization of activities of users in cloud applications and services. The means may also be implemented as stored computer executable instructions that are presented to computer 1005 as data 1040 that are temporarily stored in memory 1015 and then executed by processor 1010.

Logic 1030 may also provide means (e.g., hardware, non-transitory computer-readable medium that stores executable instructions, firmware) for performing one or more of the disclosed functions and/or combinations of the functions.

Generally describing an example configuration of the computer 1005, the processor 1010 may be a variety of various processors including dual microprocessor and other multi-processor architectures. A memory 1015 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 1035 may be operably connected to the computer 1005 via, for example, an input/output (I/O) interface (e.g., card, device) 1045 and an input/output port 1020 that are controlled by at least an input/output (I/O) controller 1047. The disk 1035 may be, for example, a magnetic disk drive, a solid-state drive, a floppy disk drive, a tape drive, a Zip drive, a flash memory card, a memory stick, and so on. Furthermore, the disk 1035 may be a compact disc ROM (CD-ROM) drive, a CD recordable (CD-R) drive, a CD rewritable (CD-RW) drive, a digital video disc ROM (DVD ROM) drive, and so on. The storage/disks thus may include one or more non-transitory computer-readable media. The memory 1015 can store a process 1050 and/or a data 1040, for example. The disk 1035 and/or the memory 1015 can store an operating system that controls and allocates resources of the computer 1005.

The computer 1005 may interact with, control, and/or be controlled by input/output (I/O) devices via the input/output (I/O) controller 1047, the I/O interfaces 1045, and the input/output ports 1020. Input/output devices may include, for example, one or more network devices 1055, displays 1070, printers 1072 (such as inkjet, laser, or 3D printers), audio output devices 1074 (such as speakers or headphones), text input devices 1080 (such as keyboards), cursor control devices 1082 for pointing and selection inputs (such as mice, trackballs, touch screens, joysticks, pointing sticks, electronic styluses, electronic pen tablets), audio input devices 1084 (such as microphones or external audio players), video input devices 1086 (such as video and still cameras, or external video players), image scanners 1088, video cards (not shown), disks 1035, and so on. The input/output ports 1020 may include, for example, serial ports, parallel ports, and USB ports.

The computer 1005 can operate in a network environment and thus may be connected to the network devices 1055 via the I/O interfaces 1045, and/or the I/O ports 1020. Through the network devices 1055, the computer 1005 may interact with a network 1060. Through the network 1060, the computer 1005 may be logically connected to remote computers 1065. Networks with which the computer 1005 may interact include, but are not limited to, a local area network (LAN), a wide area network (WAN), and other networks. In one embodiment, computer 1005 may receive log messages 305 (or other messages describing user activity) through network 1060. In one embodiment, computer 1005 may transmit messages, such as cluster assignments 845 or electronic alerts to UEBA clients 1090.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. One or more non-transitory computer-readable media that include stored thereon computer-executable instructions that, when executed by at least a processor of a computing system cause the computing system to:

generate a dataset of data points from a batch of electronic log messages that describe electronic actions taken by a plurality of user accounts, wherein a data point collectively describes those of the electronic actions that are performed by a single account;

model distinct activities based on clustering of the data points into M behavioral groups and inferring M or more distinct activities from the dataset by probabilistic activity modeling of the electronic actions, wherein the value of M is derived automatically during the clustering;

predict activity of one or more user accounts to be non-conformant based on an aggregate similarity of activity-probability distributions of other accounts in a behavioral group with respect to an activity-probability distribution of the one or more user accounts satisfying a threshold for similarity; and generate an electronic alert that indicates the one or more accounts that have non-conformant activity.

2. The non-transitory computer-readable media of claim 1, wherein the computer-executable instructions to model distinct activities and predict activity of one or more user accounts further cause the computing system to perform the modeling and prediction in two phases, a group-level phase that detects non-conformant activity that is anomalous and a user-level phase that detects non-conformant activity that is deviant.

3. The non-transitory computer-readable media of claim 1, wherein the computer-executable instructions to model distinct activities cause the computing system to:

perform the probabilistic activity modeling by latent Dirichlet allocation of weights to actions that occur in the dataset to characterize a number of distinct activities;

determine that the distinct activities are not sufficiently dissimilar based on diagonality of a similarity matrix of the distinct activities; and increase the number of distinct activities and repeat the probabilistic activity modeling until the distinct activities become sufficiently dissimilar based on the similarity matrix.

4. The non-transitory computer-readable media of claim 3, wherein:

at a group level, the number of distinct activities is initially M, the number of the behavioral groups inferred by escort clustering of the dataset; and at a user level, the number of distinct activities is initially T, a number of actions in one behavioral group that have highest weights.

5. The non-transitory computer-readable media of claim 1, wherein the computer-executable instructions for clustering further cause the computing system to:

generate first similarity values for one or more nearest neighbors of each data point of the dataset;

generate second similarity values for one or more random neighbors of each data point of the dataset;

recursively split the dataset of data points into the behavioral groups based on the first similarity values for the nearest neighbors; and stop the recursive splitting when the dataset of data points are split into a total of M behavioral groups based on the second similarity values for the random neighbors, wherein the value of M is not set prior to the recursive splitting.

6. The non-transitory computer-readable media of claim 1, wherein similarity is measured by tri-point arbitration.

7. The non-transitory computer-readable media of claim 1, wherein the data points are bags of attribute-value tuples with counts.

8. A computing system, comprising:

at least one processor connected to at least one memory;

one or more non-transitory computer readable media including instructions stored thereon that, when executed by at least the processor, cause the computing system to:

generate a dataset of data points from a batch of electronic log messages that describe electronic actions taken by a plurality of accounts, wherein each data point corresponds to a respective account and represents electronic actions performed by the respective account;

characterize distinct activities based on clustering of the data points into M behavioral groups and inferring a plurality of distinct activities from the dataset by probabilistic activity modeling of the electronic actions represented by the data points, wherein the value of M is undefined prior to the clustering and derived automatically during the clustering;

predict one or more accounts from the plurality of accounts to have non-conformant activity based on a similarity measure indicating that one or more activity-probability distributions of the one or more accounts deviates from activity-probability distributions of other accounts in a behavioral group associated with the one or more accounts; and generate an electronic alert that indicates the one or more accounts predicted to have the non-conformant activity.

9. The computing system of claim 8, wherein the instructions to characterize distinct activities and predict the one or more accounts further cause the computing system to characterize and predict in two phases, a group-level phase that detects non-conformant activity that is anomalous and a user-level phase that detects non-conformant activity that is deviant.

10. The computing system of claim 8, wherein the instructions to model distinct activities cause the computing system to:

perform the probabilistic activity modeling by latent Dirichlet allocation of weights to the electronic actions that occur in the dataset of data points to characterize a number of distinct activities;

determine that the distinct activities are not sufficiently dissimilar based on diagonality of a similarity matrix of the distinct activities; and increase the number of distinct activities and repeat the probabilistic activity modeling until the distinct activities become sufficiently dissimilar based on the similarity matrix.

11. The computing system of claim 8, wherein the instructions wherein the instructions for clustering further cause the computing system to:

recursively split the dataset of data points into behavioral groups by spectral partitioning based on first similarities of nearest neighbors to the data points; and terminate splitting at the M behavioral groups based on second similarities of random neighbors to the data points.

12. The computing system of claim 8, wherein each data point in the dataset of data points is represented as a sparse frequency vector of actions associated with term frequency-inverse document frequency values.

13. The computing system of claim 8, wherein similarity of the similarity measure is measured by tri-point arbitration.

14. The computing system of claim 8, wherein the instructions further cause the computing system to determine whether the activity of an account that is non-conformant has changed with respect to previous activity.

15. A computer-implemented method, the method comprising:

generating a dataset of data points from a batch of electronic log messages that describe electronic actions taken by a plurality of accounts, wherein each data point corresponds to a respective account and represents electronic actions performed by the respective account;

modeling distinct activities based on clustering of the data points into M behavioral groups and inferring a plurality of distinct activities from the dataset by probabilistic activity modeling of the electronic actions represented by the data points, wherein the value of M is derived from the dataset during the clustering;

predicting an account from the plurality of accounts to have non-conformant activity based on a similarity measure indicating that one or more activity-probability distributions of the account deviates from activity-probability distributions of other accounts in a behavioral group associated with the account; and generating an electronic alert that indicates the user account predicted to have the non-conformant activity.

16. The method of claim 15, further comprising performing the modeling and predicting in two phases, including: (i) a group-level phase configured to detect non-conformant activity that is anomalous, and (ii) a user-level phase configured to detect non-conformant activity that is deviant.

17. The method of claim 15, wherein the modeling further comprises latent Dirichlet allocation of weights to the electronic actions that occur in the dataset of data points to characterize a number of distinct activities from the plurality of distinct activities.

18. The method of claim 17, further comprising performing the latent Dirichlet allocation with the number of distinct activities progressively increased until the distinct activities become sufficiently dissimilar based on diagonality of a similarity matrix of the distinct activities.

19. The method of claim 15, wherein the similarity measure is an aggregate tri-point arbitration similarity of activity-probability distributions of the other accounts with an activity-probability distribution of the predicted account set as an arbiter point.

20. The method of claim 15, wherein the similarity measure is measured by tri-point arbitration and expressed in a range between negative one indicating complete dissimilarity, and positive one indicating complete similarity.

* * * * *